(12) United States Patent
Seki

(10) Patent No.: US 11,394,907 B2
(45) Date of Patent: Jul. 19, 2022

(54) IMAGING APPARATUS, IMAGE PROCESSING METHOD, AND PROGRAM

(71) Applicant: Sony Group Corporation, Tokyo (JP)

(72) Inventor: Kenzaburo Seki, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/632,242

(22) PCT Filed: May 31, 2018

(86) PCT No.: PCT/JP2018/020909
§ 371 (c)(1),
(2) Date: Jan. 17, 2020

(87) PCT Pub. No.: WO2019/021626
PCT Pub. Date: Jan. 31, 2019

(65) Prior Publication Data
US 2020/0177828 A1 Jun. 4, 2020

(30) Foreign Application Priority Data
Jul. 24, 2017 (JP) .............................. JP2017-142599

(51) Int. Cl.
*H04N 5/355* (2011.01)
*H04N 5/367* (2011.01)
*H04N 5/378* (2011.01)
(52) U.S. Cl.
CPC ......... *H04N 5/35581* (2013.01); *H04N 5/367* (2013.01); *H04N 5/378* (2013.01)

(58) Field of Classification Search
CPC ........ H04N 5/232; H04N 5/243; H04N 5/341; H04N 5/343; H04N 5/345; H04N 5/3456; H04N 5/35581; H04N 5/367; H04N 5/378; G03B 13/02
See application file for complete search history.

(56) References Cited

U.S. PATENT DOCUMENTS

| 6,529,618 | B1 * | 3/2003 | Ohara | ................... G06T 11/005 382/132 |
| 6,690,724 | B1 * | 2/2004 | Kadono | ................... G06T 9/20 375/240.01 |
| 10,694,130 | B2 * | 6/2020 | Kobayashi | ............... G02B 7/34 |

(Continued)

FOREIGN PATENT DOCUMENTS

JP 2008-186234 A 8/2008

*Primary Examiner* — Chiawei Chen
(74) *Attorney, Agent, or Firm* — Michael Best & Friedrich LLP

(57) ABSTRACT

An imaging element outputs a display image with a low pixel count obtained as a result of thinning pixels included in the imaging element during the exposure period of a recording image with a high pixel count. A recording image correction unit receives an input of the recording image from a frame memory after an elapse of the exposure period, and corrects the pixel value of a defective pixel caused by the output of the display image from the imaging element, among pixels included in the recording image, by using the value of addition of the pixel values of display images output during the exposure period of the recording image, so that the pixel value of the defective pixel is corrected to the similar pixel value as that in the case of performing an exposure process for the exposure period of the recording image.

20 Claims, 22 Drawing Sheets

(56) References Cited

U.S. PATENT DOCUMENTS

| | | | |
|---|---|---|---|
| 2009/0033774 A1* | 2/2009 | Ohishi | H04N 5/3653 348/241 |
| 2009/0295981 A1* | 12/2009 | Watanabe | G03B 13/32 348/345 |
| 2011/0169987 A1* | 7/2011 | Gann | H04N 5/23229 348/246 |
| 2011/0267533 A1* | 11/2011 | Hirose | H04N 9/04557 348/345 |
| 2012/0057038 A1* | 3/2012 | Suzuki | H04N 5/23245 348/220.1 |
| 2013/0051665 A1* | 2/2013 | Shinozaki | G06T 5/00 382/167 |
| 2015/0103210 A1* | 4/2015 | Inoue | H04N 5/232122 348/239 |
| 2015/0109498 A1* | 4/2015 | Aoki | H04N 9/04515 348/280 |
| 2015/0117832 A1* | 4/2015 | Aoki | H04N 5/3742 386/224 |
| 2015/0124129 A1* | 5/2015 | Aoki | H04N 9/077 348/280 |
| 2016/0344958 A1* | 11/2016 | Kondo | H04N 5/235 |
| 2016/0379075 A1* | 12/2016 | Ando | G06K 9/6267 382/103 |

* cited by examiner

IMAGING APPARATUS, IMAGE PROCESSING METHOD, AND PROGRAM

TECHNICAL FIELD

The present disclosure relates to an imaging apparatus, an image processing method, and a program. In particular, the present disclosure relates to an imaging apparatus, an image processing method, and a program that enable a high-quality captured image to be acquired while an image continues to be displayed on a display unit of the imaging apparatus.

BACKGROUND ART

In the case of capturing images by using cameras (imaging apparatuses), many users (image capturing persons) check images displayed on display units such as LCD display units or electric viewfinders (EVFs) of the cameras.

For example, a user (image capturing person) can determine imaging timing and press a release button (shutter button) while observing an image displayed on the display unit.

Furthermore, the user (image capturing person) can check a captured image by displaying the captured image on the display unit.

In a case where imaging is not performed, a current image incident on an imaging element of the imaging apparatus, that is, a live view image (LV image) is displayed on the display unit of the imaging apparatus. The live view image (LV image) is also called a through image. The user (image capturing person) can check the live view image (LV image) displayed on the display unit to determine imaging timing.

In the case of performing an imaging process, the user (image capturing person) presses a release button (shutter button). In accordance with the release button operation process, the imaging element starts an exposure process of a recording image.

However, in many imaging apparatuses, reading of the live view image (LV image) from the imaging element is stopped upon the start of the exposure process of the recording image. As a result, there occurs a period in which nothing is displayed on the display unit. A so-called blackout of the display unit occurs. Note that the blackout of the display unit is described in, for example, Patent Document 1 (Japanese Patent Application Laid-Open No. 2015-186234).

When a blackout occurs, the user (image capturing person) cannot check a display image.

Furthermore, there is a possibility that the blackout of the display unit, which occurs upon the pressing of the release button, may cause a problem that the user has a sense of discomfort or misunderstands that an operation error has occurred, or other problems.

CITATION LIST

Patent Document

Patent Document 1: Japanese Patent Application Laid-Open No. 2008-186234

SUMMARY OF THE INVENTION

Problems to be Solved by the Invention

The present disclosure has been made in view of, for example, the above-described problems. An object of the present disclosure is to provide an imaging apparatus, an image processing method, and a program that enable a high-quality captured image to be acquired while an image continues to be displayed on a display unit of the imaging apparatus.

Solutions to Problems

A first aspect of the present disclosure is an imaging apparatus including:

an imaging element that outputs a second image with a second pixel count that is lower than a first pixel count during an exposure period for acquiring a first image with the first pixel count; and an image correction unit that corrects pixel values of pixels corresponding to pixels included in the second image, among pixels included in the first image.

Moreover, a second aspect of the present disclosure is an image processing method to be performed in an imaging apparatus, the method including:

causing an imaging element to output a second image with a second pixel count that is lower than a first pixel count during an exposure period for acquiring a first image with the first pixel count; and causing an image correction unit to correct pixel values of pixels corresponding to pixels included in the second image, among pixels included in the first image.

Moreover, a third aspect of the present disclosure is a program for causing image processing to be performed in an imaging apparatus, the program including:

causing an imaging element to output a second image with a second pixel count that is lower than a first pixel count during an exposure period for acquiring a first image with the first pixel count; and causing an image correction unit to correct pixel values of pixels corresponding to pixels included in the second image, among pixels included in the first image.

Note that the program according to the present disclosure is a program that can be provided through, for example, a storage medium or a communication medium to be provided in a computer-readable form to an information processing apparatus or a computer system that can execute various program codes. As a result of providing such a program in a computer-readable form, a process corresponding to the program is implemented on the information processing apparatus or the computer system.

Still other objects, features, and advantages of the present disclosure will be apparent from more detailed descriptions based on embodiments of the present disclosure to be described later and the accompanying drawings. Note that in the present specification, the term "system" refers to a logical set configuration of a plurality of devices, and is not limited to one in which the devices of each configuration are in the same casing.

Effects of the Invention

According to the configuration of an embodiment of the present disclosure, an apparatus and a method are implemented which enable a display image to be output even during the exposure period of a recording image and also enable a high-quality recording image to be generated.

Specifically, for example, the imaging element outputs a display image with a low pixel count obtained as a result of thinning pixels included in the imaging element during the exposure period of a recording image with a high pixel count. A recording image correction unit receives an input of the recording image from a frame memory after an elapse of the exposure period, and corrects the pixel value of a defective pixel caused by the output of the display image from the imaging element, among pixels included in the recording image, by using the value of addition of the pixel values of display images output during the exposure period of the recording image, so that the pixel value of the defective pixel is corrected to the similar pixel value as that in the case of performing an exposure process for the exposure period of the recording image.

As a result of these processes, an apparatus and a method are implemented which enable a display image to be output even during the exposure period of a recording image and also enable a high-quality recording image to be generated.

Note that the effects described in the present specification are merely illustrative and not restrictive, and additional effects may also be achieved.

MODE FOR CARRYING OUT THE INVENTION

Details of an imaging apparatus, an image processing method, and a program according to the present disclosure will be described below with reference to the drawings. Note that description will be provided in accordance with the following items.

1. Outline of Image Capturing and Display Process in Imaging Apparatus
2. Outline of Processes to Be Performed by Imaging Apparatus According to Present Disclosure
3. Configuration Example of Imaging Apparatus According to Present Disclosure
4. Configuration of Signal Processing Unit and Process to Be Performed Therein
5. Processing Example in Case of Imaging Apparatus with Mechanical Shutter
6. Embodiment of Correcting Defective Pixel in Recording Image on Basis of Pixel Values of Pixels Surrounding Defective Pixel
7. Other Embodiments
8. Summary of Configurations of Present Disclosure 1. Outline of Image Capturing and Display Process in Imaging Apparatus First, an outline of image capturing and a display process in a general imaging apparatus (camera) will be described with reference to FIG. 1 and subsequent drawings.

Figure 1:
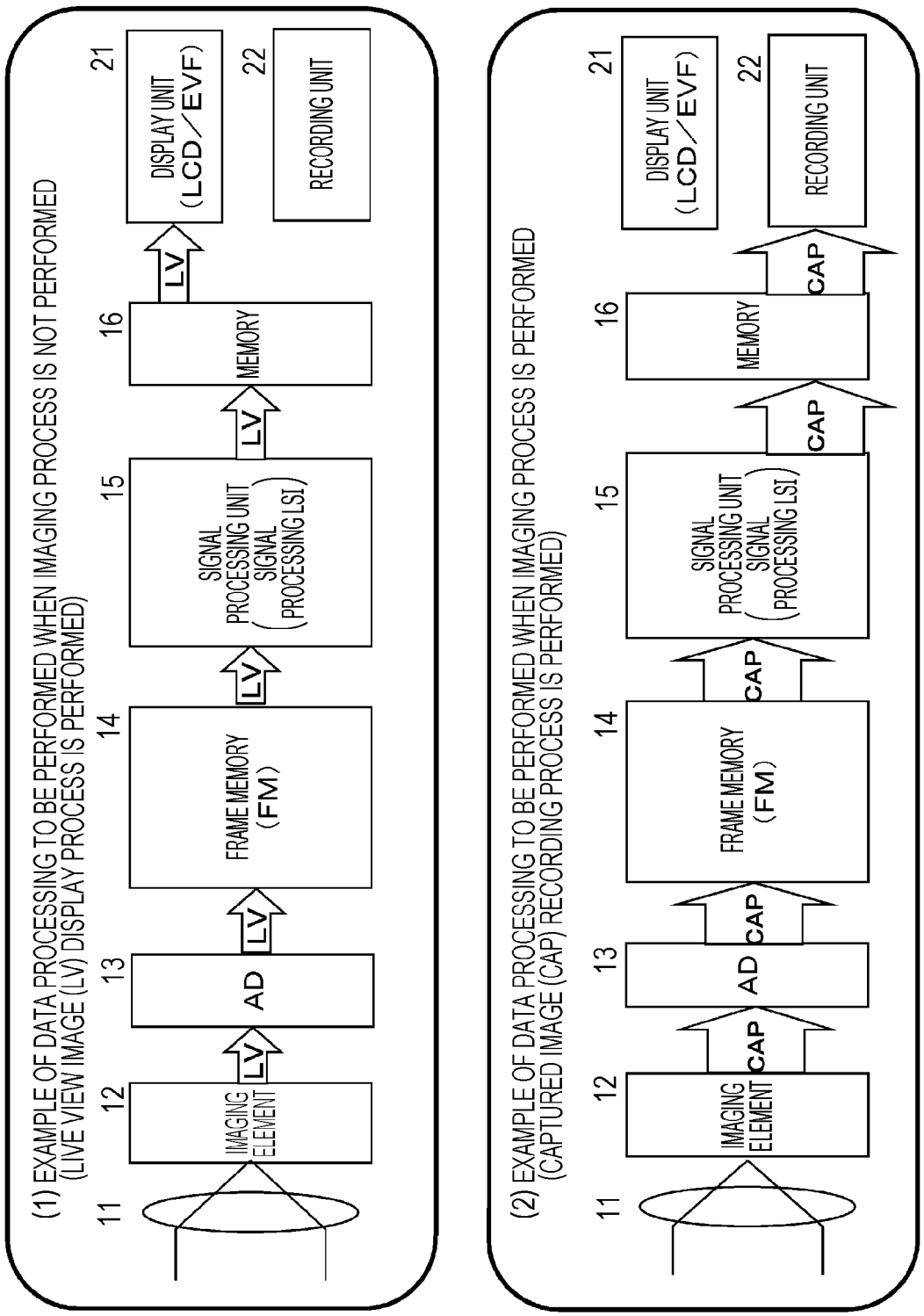
FIG. 1 is a diagram describing data processing sequences in image capturing and a display process in an imaging apparatus.

FIG. 1 shows the following examples of processing in the general imaging apparatus.

(1) An example of data processing to be performed when an imaging process is not performed (a live view image (LV) display process is performed)

(2) An example of data processing to be performed when an imaging process is performed (a captured image (CAP) recording process is performed)

Note that the live view image (LV) refers to an image displayed on a display unit of the imaging apparatus, such as an LCD or an EVF, which can be checked by a user (image capturing person). The live view image (LV), which is also called a through image, is an image that is continuously displayed on the display unit regardless of whether or not an imaging process is performed.

Meanwhile, the captured image (CAP) refers to an image captured by a user (image capturing person) operating a release button (shutter button) of the imaging apparatus. The captured image (CAP) is recorded in a recording unit (medium) of the imaging measure.

Note that, in general, the captured image (CAP) is acquired and recorded as a high-resolution image with a high pixel count reflecting the number of pixels of an imaging element. Meanwhile, the live view image (LV) is acquired and displayed as a low-pixel image in accordance with the number of pixels that can be displayed on the display unit.

An image (thinned image) including only some of pixels included in the imaging element, obtained as a result of thinning the pixels, is used as the live view image (LV).

That is, the live view image (LV) is a lower pixel image than the captured image (CAP).

Described below is an example of data processing to be performed when an imaging process is not performed (a live view image (LV) display process is performed) as shown in (1) of FIG. 1.

Light incident through an optical lens 11 enters an imaging unit, that is, an imaging element 12 including, for example, a CMOS image sensor, so that image data obtained by photoelectric conversion are output. Note that an image output in this case is a display image (LV image) to be displayed on a display unit 21.

Hereinafter, an image to be displayed on the display unit is referred to as a display image or an LV image. Meanwhile, an image for imaging recording is referred to as a recording image, a captured image, or a CAP image.

When outputting a display image (LV image) to be displayed on the display unit, the imaging element 12 outputs an image with a low pixel count obtained as a result of thinning a part of pixel data of the imaging element, without outputting all the pixel data.

In a case where the imaging process is performed, it is necessary to generate a recording image with a high pixel count. Therefore, substantially all the pixel data of the imaging element are output.

When the imaging process is not performed (the live view image (LV) display process is performed) as shown in (1) of FIG. 1, the imaging element 12 inputs an output image (LV image) with a low pixel count to an AD conversion unit 13.

The AD conversion unit 13 performs A/D conversion of the input signal, that is, a process of converting an analog signal into a digital signal, and stores the converted digital value in a frame memory 14.

The image stored in the frame memory 14 is output to a signal processing unit (signal processing LSI) 15.

Note that a display image (LV image) to be displayed on the display unit may be directly input from the AD conversion unit 13 to the signal processing unit 15 without being stored in the frame memory 14.

The signal processing unit 15 performs signal processing for a general camera, such as white balance (WB) adjustment and gamma correction, to generate an output image, that is, an image (LV image) to be displayed on the display unit 21, and stores the generated image in a memory 16.

The display unit 21 displays the LV image stored in the memory 16.

The display unit 21 includes, for example, an LCD and an EVF, and can be checked by an image capturing person.

Next, the following describes an example of data processing to be performed when an imaging process is performed (a captured image (CAP) recording process is performed) as shown in (2) of FIG. 1.

When an image capturing person operates (presses) the release button (shutter button), the process of (2) is performed.

When the image capturing person operates (presses) the release button (shutter button), light incident through the optical lens 11 enters the imaging unit, that is, the imaging element 12 including, for example, a CMOS image sensor, so that an exposure process starts.

When the exposure process ends in the imaging element 12, the imaging element 12 outputs image data obtained by photoelectric conversion to the AD conversion unit 13. Note that the image output in this case is a recording image (CAP image) to be recorded and stored in a recording unit 22.

The recording image (CAP image) is a high-pixel image reflecting the number of pixels of the imaging element 12. The recording image (CAP image) is a high-pixel image with a higher pixel count than the display image (LV image) described with reference to (1).

In FIG. 1, a thin arrow shown in (1) indicates the LV image, and a thick arrow shown in (2) indicates the CAP image. Thus, the thicknesses of the arrows indicate whether the pixel count is high or low.

The AD conversion unit 13 performs A/D conversion of the input signal, that is, a process of converting an analog signal into a digital signal, and stores the converted digital value in a frame memory 14.

The image stored in the frame memory 14 is output to a signal processing unit (signal processing LSI) 15.

The signal processing unit 15 performs signal processing for a general camera, such as white balance (WB) adjustment and gamma correction, to generate an output image.

In this case, the signal processing unit 15 generates a high-pixel recording image (CAP image) to be stored in the recording unit 22, and stores the image in the memory 16.

The recording unit 22 stores the high-pixel recording image (CAP image) stored in the memory 16.

The above is the outline of the respective processes to be performed when image capturing is performed and not performed in the imaging apparatus.

Next, the temporal flow of these processes will be described with reference to timing charts shown in FIG. 2 and subsequent drawings.

Figure 2:
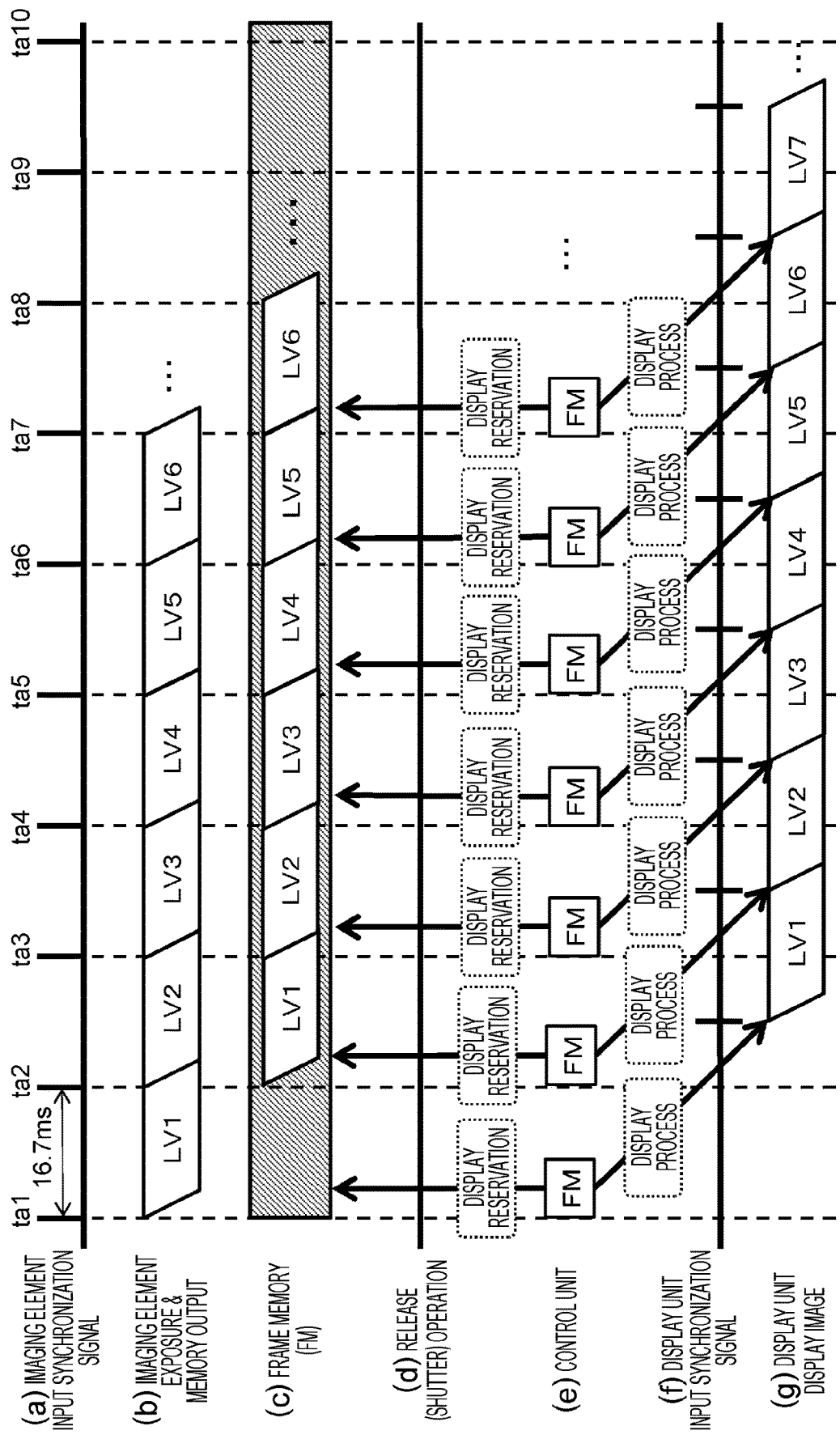
FIG. 2 is a diagram showing a timing chart describing a process sequence in the case of displaying display images (LV images) on a display unit of the imaging apparatus.

FIG. 2 is a timing chart describing a process to be performed in a period in which an imaging process is not performed by a user (image capturing person), that is, the release button (shutter button) is not pressed by the user. That is, FIG. 2 is a timing chart describing a process sequence in a case where display images (LV images) are displayed on the display unit of the imaging apparatus.

Time goes from left to right.

FIG. 2 shows the following processing timings (a) to (g) separately.

(a) Imaging element input synchronization signal
(b) Exposure process of imaging element and output to frame memory
(c) Image stored in frame memory (FM)
(d) Imaging operation (release (shutter) operation)
(e) Process of control unit (f) Display unit input synchronization signal (g) Display unit display image (a) An imaging element input synchronization signal is a synchronization signal to be input to the imaging element 12 under the control of a control unit of the imaging apparatus. In the present example, the setting is such that a synchronization signal issued every 16.7 msec is input to the imaging element 12.

In response to the input of the synchronization signal, the imaging element 12 starts various processes, or updates processes to be performed, such as the switching of processes.

(b) The exposure process of the imaging element and an output to the frame memory indicate an exposure process in the imaging element 12 and a process of storing, in the frame memory 14, an image obtained by AD conversion of the result of exposure.

LV1, LV2, LV3, . . . shown in the drawing indicate the exposure processes of display images (LV images) to be displayed on the display unit 21.

The exposure process of each of these images is performed for each synchronization signal issued every 16.7 msec.

(c) The image stored in the frame memory (FM) indicates a sequence of images stored in the frame memory 14.

(d) The Imaging operation (release (shutter) operation) indicates an imaging operation, that is, a process of pressing the release button (shutter button) to be performed by a user (image capturing person).

FIG. 2 shows a process sequence that applies to a case where the user (image capturing person) does not perform an imaging operation. Thus, no imaging operation timing is shown in FIG. 2.

Note that a process to be performed in a case where the imaging process is performed will be described later with reference to FIG. 3.

(e) The process of the control unit describes a sequence of control processes to be performed in the control unit of the imaging apparatus. Note that although no control unit is shown in FIG. 1 described above, the imaging apparatus includes the control unit that controls a process performed by the imaging apparatus according to a program stored in, for example, a storage unit. The control unit controls a process to be performed by each constituent part shown in FIG. 1.

Some of various processes to be performed by the control unit are shown in (e) process of the control unit of FIG. 2. FIG. 2 shows a sequence of processes mainly related to control of an image to be displayed on the display unit.

Rectangular boxes denoted by FM are shown as a sequence of (e) processes of the control unit in FIG. 2.

FM stands for control of a process of reservation for displaying a latest image stored in the frame memory (FM) and a display process of displaying the latest image stored in the frame memory (FM) on the display unit 21.

As a result of this control process, the images stored in the frame memory 14 are sequentially displayed on the display unit 21.

(f) The display unit input synchronization signal is a synchronization signal to be input to the display unit 21 under the control of the control unit of the imaging apparatus. The display unit 21 performs a process such as the switching of display images in response to the input of the synchronization signal.

(g) The display unit display image refers to an image to be displayed on the display unit 21.

LV1, LV2, . . . correspond to image frames 1 and 2 of display images, and indicate that display frames are switched at signal intervals of the display unit input synchronization signal. That is, a moving image is displayed on the display unit 21 as a live view image (through image).

Figure 3:
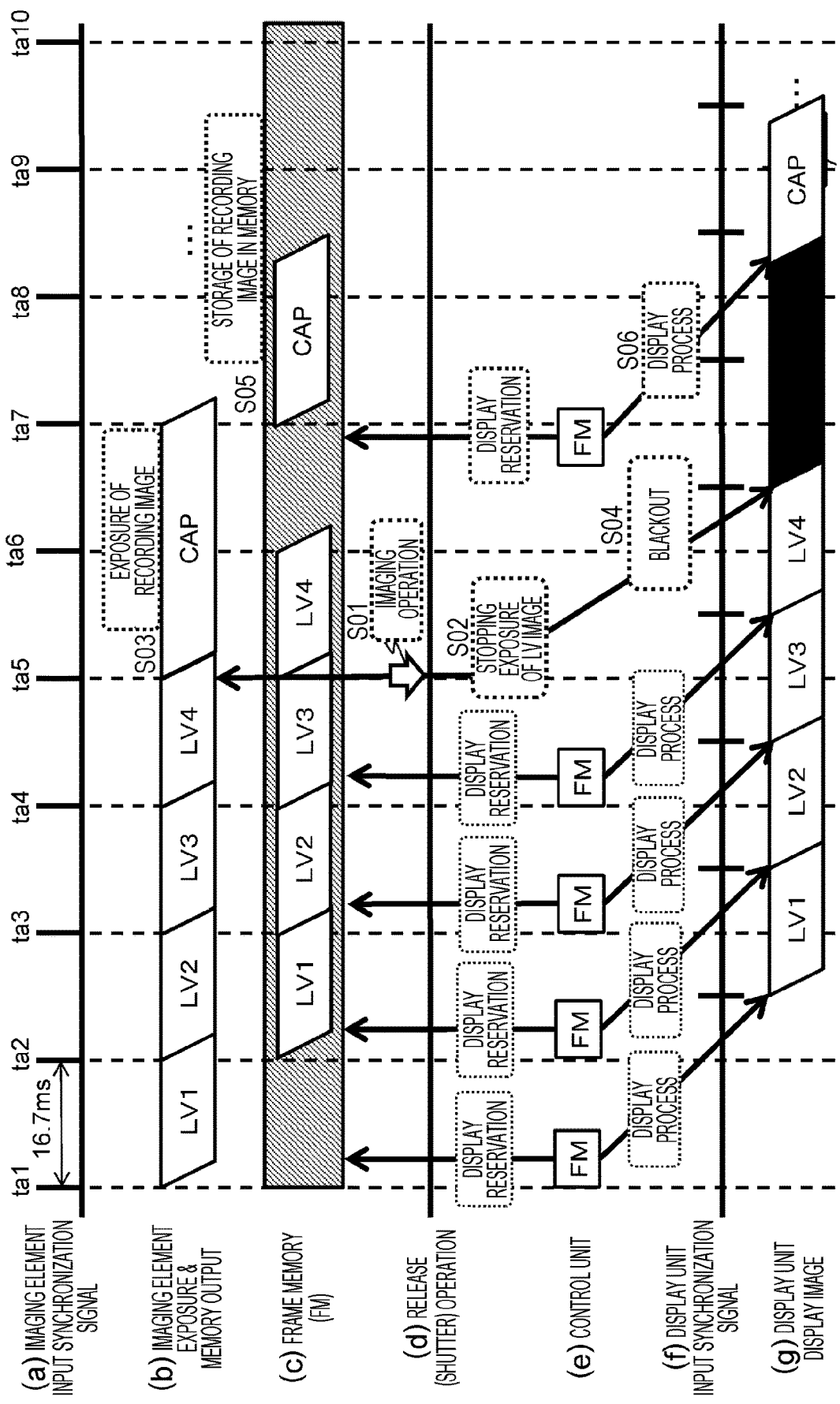
FIG. 3 is a diagram showing a timing chart describing a process sequence in the case of performing an imaging process and a recording image (CAP image) recording process while displaying display images (LV images) on the display unit of the imaging apparatus.

Next, referring to FIG. 3, the following describes a process to be performed in a case where an imaging process is performed by a user (image capturing person), that is, the release button (shutter button) is pressed by the user. That is, the following describes a process sequence that applies to a case where the imaging process is performed by the user (image capturing person) in a period in which display images (LV images) are displayed on the display unit of the imaging apparatus.

Time goes from left to right.

FIG. 3 shows the following processing timings (a) to (g) separately as in FIG. 2.

(a) Imaging element input synchronization signal (b) Exposure process of imaging element and output to frame memory (c) Image stored in frame memory (FM)

(d) Imaging operation (release (shutter) operation)

(e) Process of control unit (f) Display unit input synchronization signal (g) Display unit display image Assume that an imaging operation is performed by the user, that is, the release button (shutter button) is pressed by the user in step S01, as shown in the vicinity of the center of the line of (d) imaging operation (release (shutter) operation) of FIG. 3.

When the imaging operation is performed by the user, that is, the release button (shutter button) is pressed by the user, the control unit requests, in step S02, that the exposure process of the display image (LV image) be stopped in the imaging element 12, and that the switching of modes be started. Moreover, the exposure process of a recording image (CAP) image is started on the imaging element side in step S03.

In these processes, the control unit performs processes such as a process of outputting control signals to the imaging element and signal processing unit and a setting process based on the control signals in the imaging element and the signal processing unit.

These processes include, for example, a process of switching modes of the imaging element (image sensor) 12.

As described above, when outputting a display image (LV image) to be displayed on the display unit 21, the imaging element 12 outputs an image with a low pixel count obtained as a result of thinning a part of the pixel data of the imaging element, without outputting all the pixel data.

However, in a case where the imaging process is performed, it is necessary to generate a recording image with a high pixel count. Therefore, substantially all the pixel data of the imaging element are output.

When the exposure of the recording image is started, there are performed processes such as a mode switching process for changing the output data of the imaging element 12.

When the mode switching process for changing the output data is started, the imaging element 12 is forced to stop the exposure and memory output processes of the display image (LV image).

As shown in the drawing, the control unit stops supplying a display image to the display unit 21 in step S04. That is, a blackout occurs in which nothing is displayed on the display unit 21.

Thus, during an exposure period of the recording image (CAP image) in the imaging element 12, the display image (LV image) cannot be acquired from the imaging element 12. Accordingly, a blackout (black Image output) occurs in which nothing is displayed on the display unit 21.

Note that an exposure period in which the exposure process of the recording image (CAP image) is performed by the imaging element 12 in step S03 is, for example, a period set by the user, that is, a period set in accordance with a shutter speed.

A recording image (CAP image) obtained by the exposure process of the recording image (CAP image) by the imaging element 12 in step S03 is stored in the frame memory (FM) in step S05.

In step S06, the control unit reads the recording image (CAP image) from the frame memory (FM), and performs a process of displaying the recording image (CAP image) on the display unit 21.

As can be understood from the sequence diagram shown in FIG. 3, when the imaging process is performed by the user (image capturing person), that is, the release button (shutter button) is pressed by the user, the exposure process of the recording image (CAP image) is started by the imaging element 12. In this exposure period, the display image (LV image) from the imaging element 12 cannot be stored in the frame memory 14. Accordingly, it is not possible to perform the process of displaying the display image (LV image) on the display unit 21.

That is, a blackout occurs in which nothing is displayed on the display unit 21.

Described below is an embodiment of the present disclosure with a configuration that prevents the occurrence of such a blackout in the display unit.

2. Outline of Processes to be Performed by Imaging Apparatus According to Present Disclosure First, an outline of processes to be performed by the imaging apparatus according to the present disclosure will be described with reference to FIGS. 4 and 5.

The imaging apparatus according to the present disclosure continuously displays the display image (LV image) on the display unit even while the imaging element performs the exposure process of the recording image (CAP image). Moreover, the imaging apparatus according to the present disclosure also enables a high-pixel recording image (CAP image) to be generated by use of all the pixels of the imaging element, and to be recorded.

That is, the imaging element of the imaging apparatus according to the present disclosure outputs a low-pixel display image (second image) with a lower pixel count (second pixel count) than a first pixel count during the exposure period for acquiring a high-pixel (first pixel count) recording image (first image).

Figure 4:
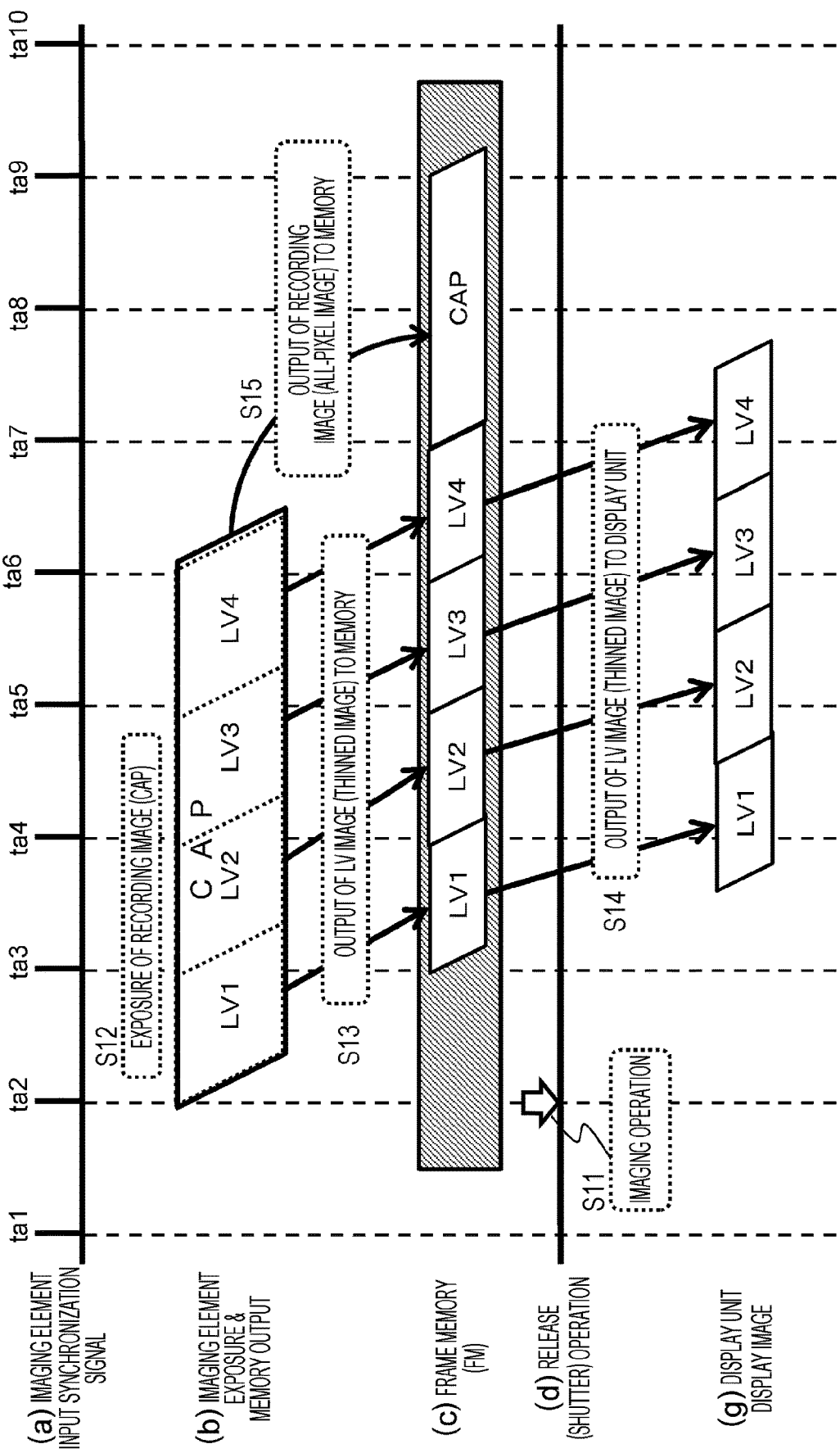
FIG. 4 is a diagram describing an outline of processes to be performed by an imaging apparatus according to the present disclosure.

FIG. 4 is a diagram describing an outline of processes to be performed by the imaging apparatus according to the present disclosure.

FIG. 4 is a diagram describing the process to be performed in a case where an imaging process is performed by the user (image capturing person), that is, the release button (shutter button) is pressed by the user, as with the case described above with reference to FIG. 3. That is, FIG. 4 is a diagram describing the process sequence that applies to the case where the imaging process is performed by the user (image capturing person) in the period in which a display image (LV image) is displayed on the display unit of the imaging apparatus.

Time goes from left to right.

FIG. 4 shows the following processing timings (a) to (g) separately.

(a) Imaging element input synchronization signal
(b) Exposure process of imaging element and output to frame memory
(c) Image stored in frame memory (FM)
(d) Imaging operation (release (shutter) operation)
(g) Display unit display image Assume that an imaging operation is performed by the user, that is, the release button (shutter button) is pressed by the user in step S11, as shown on the line of (d) imaging operation (release (shutter) operation) of FIG. 4.

When the imaging operation is performed by the user, that is, the release button (shutter button) is pressed by the user, the exposure process of a recording image (CAP) image is started in the imaging element in step S12 as shown in "(b) exposure process of imaging element and output to frame memory" of FIG. 4.

The imaging apparatus according to the present disclosure continues a process of causing a display image (LV image) to be supplied from the imaging element to the frame memory to be stored therein, even during the period in which the exposure process of the recording image (CAP) image is performed in the imaging element.

As shown in "(b) exposure process of imaging element and output to frame memory" of FIG. 4, the exposure process of the recording image (CAP image) is performed in a period between synchronization signals ta2 and ta6. In this period, display images (LV images) are output from the imaging element to the frame memory in units of a prescribed exposure period (for example, 16.7 ms).

Step S13 "output of LV image (thinned image) to memory" shown in FIG. 4 corresponds to this process.

As described above, the display image (LV image) is not an image resulting from output of the pixel values of all the pixels of the imaging element, but a low-pixel image based only on some of the pixels.

The imaging apparatus according to the present disclosure causes the pixel values of pixels included in a display image (LV image) to be output from the imaging element to the frame memory in units of an exposure period (for example, 16.7 ms) prescribed for the LV image even during the period in which the exposure process of the recording image (CAP) image is performed.

The item "(c) frame memory" of FIG. 4 shows a plurality of display images (LV images) (LV1 to LV4) output from the imaging element during the exposure period of the recording image (CAP image) between synchronization signals ta2 and ta6.

As shown in step S14 "output of LV image (thinned image) to display unit" of FIG. 4, the plurality of display images (LV images) (LV1 to LV4) stored in (c) the frame memory is sequentially output as "(g) display unit display images" to the display unit.

As described above, the imaging apparatus according to the present disclosure is configured to acquire a display image (LV image) from the imaging element and to continue a process of displaying the image on the display unit even during the period in which the exposure of a recording image (CAP image) is performed in the imaging element. Thus, no blackout (black Image output) occurs in the imaging apparatus according to the present disclosure.

Note that at the end of the recording image (CAP image) exposure period of step S12 shown in FIG. 4, the recording image (CAP image) is stored in the frame memory as shown in step S15.

However, if such a process is performed, pixel values of pixels of different exposure periods coexist in the pixel values of the recording image (CAP image) stored in the frame memory, due to output of the pixel values of the display images (LV images) during the exposure period of the recording image.

This problem will be described with reference to FIG. 5.

Figure 5:
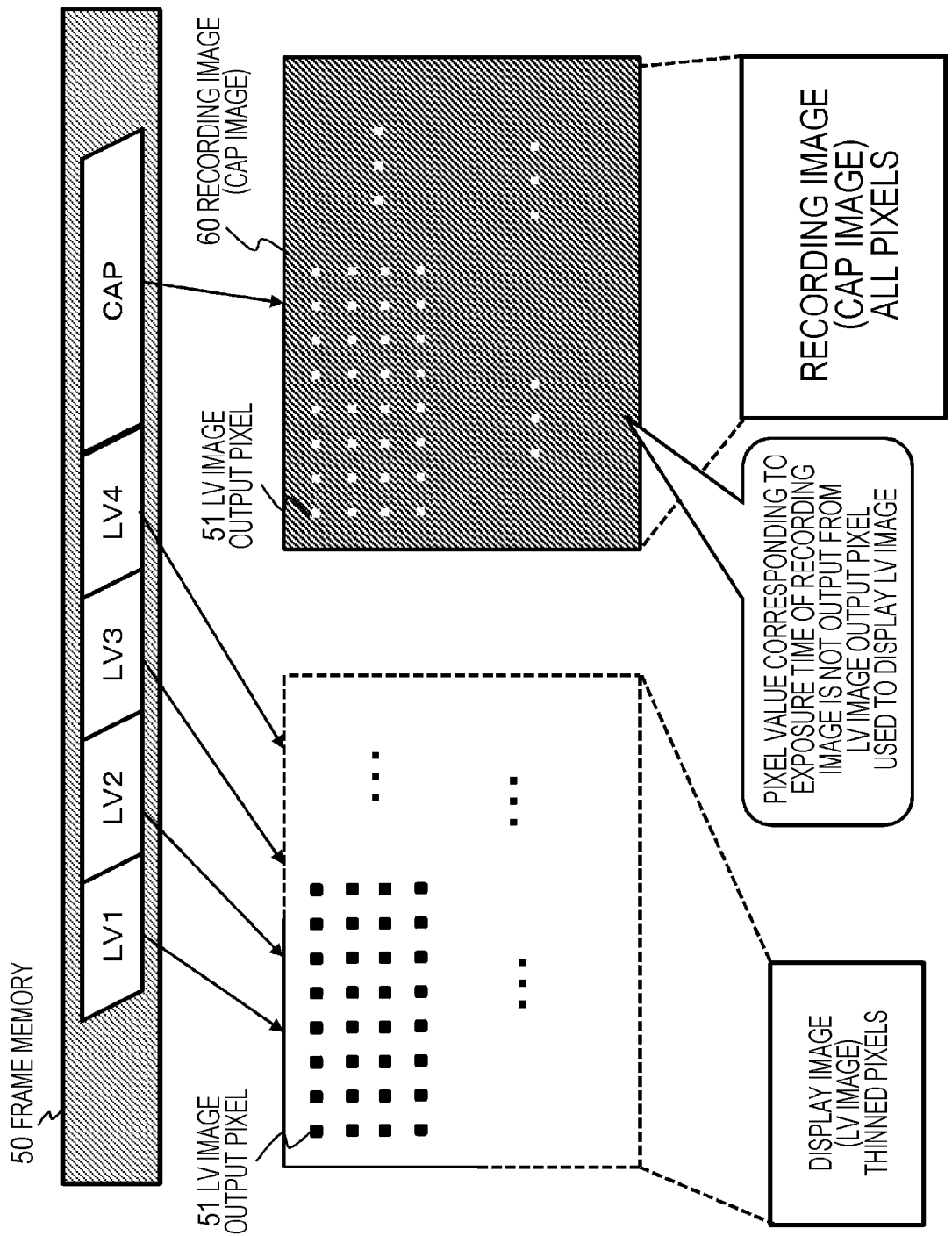
FIG. 5 is a diagram describing a problem in the case of performing the imaging process and the recording image (CAP image) recording process while displaying display images (LV images) on the display unit of the imaging apparatus.

FIG. 5 shows the following two images to be stored in the frame memory: a display image (LV image), and a recording image (CAP image).

FIG. 5 is a diagram describing the configurations of these two images.

As described above, the recording image (CAP image) is a high-pixel image resulting from output of the pixel values of substantially all the pixels included in the imaging element. That is, the recording image (CAP image) is a high-quality image.

In contrast, the display image (LV image) is a low-pixel image including only some of the pixels output as a result of thinning the pixels included in the imaging element. That is, the display image (LV image) is a low-quality image.

In the example shown in FIG. 5, LV image constituent pixels 51 are pixels selected from all the pixels included in the imaging element to be included in display images (LV images).

Images LV1 to LV4, which are display images (LV images) to be stored in a frame memory 50, are low-pixel images including only the LV image constituent pixels 51.

The low-pixel display images (LV images) LV1 to LV4 including only the LV image constituent pixels 51 are sequentially read from the imaging element, stored in the frame memory 50, and displayed on the display unit, in units of the exposure period of a display image in the imaging element (for example, in units of 16.7 msec).

Note that a period in which the low-pixel display images (LV images) LV1 to LV4 are output corresponds to the exposure period of the recording image (CAP image).

Accordingly, an exposure process is continuously performed on pixels other than the LV image constituent pixels 51 included in the imaging element during the exposure period of the recording image (CAP image).

When the exposure period of the recording image (CAP image) ends, the recording image (CAP image) is stored in the frame memory 50.

The pixel values of substantially all the pixels of the imaging element form the recording image (CAP image) stored in the frame memory 50. Meanwhile, some of the pixels are used to output the display image (LV image). No pixel values resulting from a continuous exposure process are set in these pixels during the exposure period of the recording image (CAP image).

That is, the LV image constituent pixels 51 forming a part of a recording image (CAP image) 60 shown in the drawing are used to output the display image (LV image) during the exposure period of the recording image (CAP image). Thus, pixel values resulting from continuous exposure are not set in the LV image constituent pixels 51 forming the part of the recording image (CAP image) 60, during the exposure period of the recording image (CAP image).

Note that pixels other than the LV image constituent pixels 51 in the recording image (CAP image) 60 are not used to output the display image (LV image). Thus, pixel values resulting from continuous exposure are set in the pixels other than the LV image constituent pixels 51, during the exposure period of the recording image (CAP image).

Thus, the recording image (CAP image) stored in the frame memory 50 is an image including defective pixels in which the following two types of pixel value corresponding to the exposure period are set:

(a) a normal exposure pixel (a pixel other than the LV image constituent pixel 51)=a pixel in which a pixel value is set, the pixel value resulting from the exposure process during the exposure period of the recording image, and (b) a defective pixel (LV image constituent pixel 51)=a pixel in which an erroneous pixel value is set instead of the pixel value resulting from the exposure process during the exposure period of the recording image.

The imaging apparatus according to the present disclosure performs a correction process of correcting a recording image including such a defective pixel and setting, in the defective pixel, a normal pixel value, that is, a pixel value resulting from the exposure process during the exposure period of the recording image. In addition, the imaging apparatus according to the present disclosure performs a process of generating and recording the corrected recording image.

The following describes a specific configuration of the imaging apparatus according to the present disclosure and a detailed process to be performed therein.

3. Configuration Example of Imaging Apparatus According to Present Disclosure First, a configuration example of an imaging apparatus 100 according to the present disclosure will be described with reference to FIG. 6.

Figure 6:
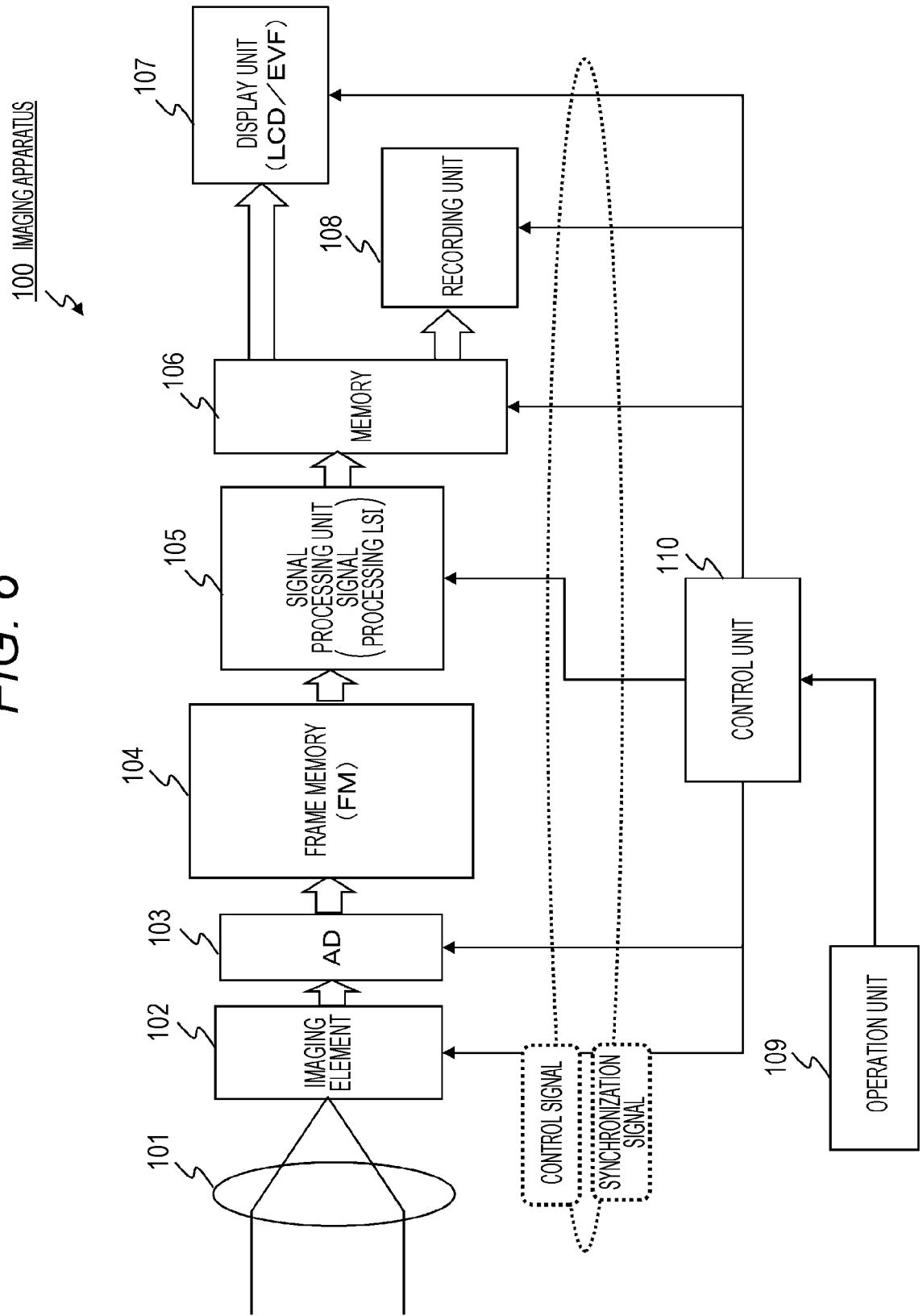
FIG. 6 is a diagram describing a configuration example of the imaging apparatus according to the present disclosure.

The imaging apparatus 100 shown in FIG. 6 includes an optical lens 101, an imaging element 102, an AD conversion unit 103, a frame memory 104, a signal processing unit (signal processing LSI) 105, a memory 106, a display unit (LCD/EVF) 107, a recording unit 108, an operation unit 109, and a control unit 110.

The operation unit 109 includes, for example, a release button (shutter button) and an operation part for performing a user input such as the setting of an imaging form and an imaging mode and the setting of an image to be displayed on the display unit 107.

Note that the display unit 107 can also be configured as a touch panel to be used as a user operation unit.

The control unit 110 inputs control signals and synchronization signals to the imaging element 102 to the recording unit 108, and performs various types of process control such as control of timing at which a process is performed in each constituent part.

For example, the control unit 110 controls output of a synchronization signal defining a processing timing of the imaging element 102, and controls output of a synchronization signal defining the timing of switching images to be displayed on the display unit 107.

Specifically, the control unit 110 includes a CPU or the like that performs processes according to programs stored in the storage unit (not shown).

The programs include, for example, control programs for processes of capturing an image, recording an image, and displaying an image, and a synchronization signal output control program.

Light incident through the optical lens 101 enters an imaging unit, that is, the imaging element 102 including, for example, a CMOS image sensor, so that image data obtained by photoelectric conversion are output. Note that the imaging element 102 outputs a low-pixel display image (LV image) to be displayed on the display unit 107 in a case where no imaging process is performed, and outputs a high-pixel recording image (CAP image) to be stored in the recording unit 108 in a case where an imaging process is performed.

Note that, as described above, the imaging apparatus 100 according to the present disclosure continuously displays the display image (LV image) on the display unit even while the imaging element 102 performs the exposure process of the recording image (CAP image). That is, the imaging element 102 outputs the low-pixel display image (second image) with the lower pixel count (second pixel count) than the first pixel count during the exposure period for acquiring the high-pixel (first pixel count) recording image (first image).

The image output from the imaging element 102 is input to the AD conversion unit 103.

The AD conversion unit 103 performs A/D conversion of the input signal, that is, a process of converting an analog signal into a digital signal, and stores the converted digital value in the frame memory 104.

The images stored in the frame memory 104 are sequentially output to the signal processing unit (signal processing LSI) 105.

The signal processing unit 105 performs signal processing for a general camera, such as white balance (WB) adjustment and gamma correction, and also performs a correction process of a defective pixel in the recording image described above with reference to FIG. 5.

That is, the signal processing unit 105 performs a process of correcting the pixel values of pixels corresponding to pixels included in the low-pixel display image (second image) with the lower pixel count (second pixel count) than the first pixel count, among pixels included in the high-pixel (first pixel count) recording image (first image).

Note that various different types of correction process are performed in the imaging apparatus according to the present disclosure. For example, there are performed a correction process using a pixel value that has been set in a pixel to be corrected and a process of setting a new pixel value after temporarily canceling the pixel value that has been set in the pixel to be corrected. Specific examples of these correction processes will be described later.

The signal processing unit 105 generates at least either a display image (LV image) to be displayed on the display unit 107 or a recording image (CAP image) to be stored in the recording unit 108, and stores the generated image in the memory 106.

The display unit 107 displays the display image (LV image) stored in the memory 106.

The display unit 107 includes, for example, an LCD and an EVF, and can be checked by an image capturing person.

Furthermore, the recording unit 108 stores the recording image (CAP image) stored in the memory 106.

4. Configuration of Signal Processing Unit and Process to be Performed Therein Next, the following describes a specific configuration of the signal processing unit 105 of the imaging apparatus 100 shown in FIG. 6 and a process to be performed therein.

Figure 7:
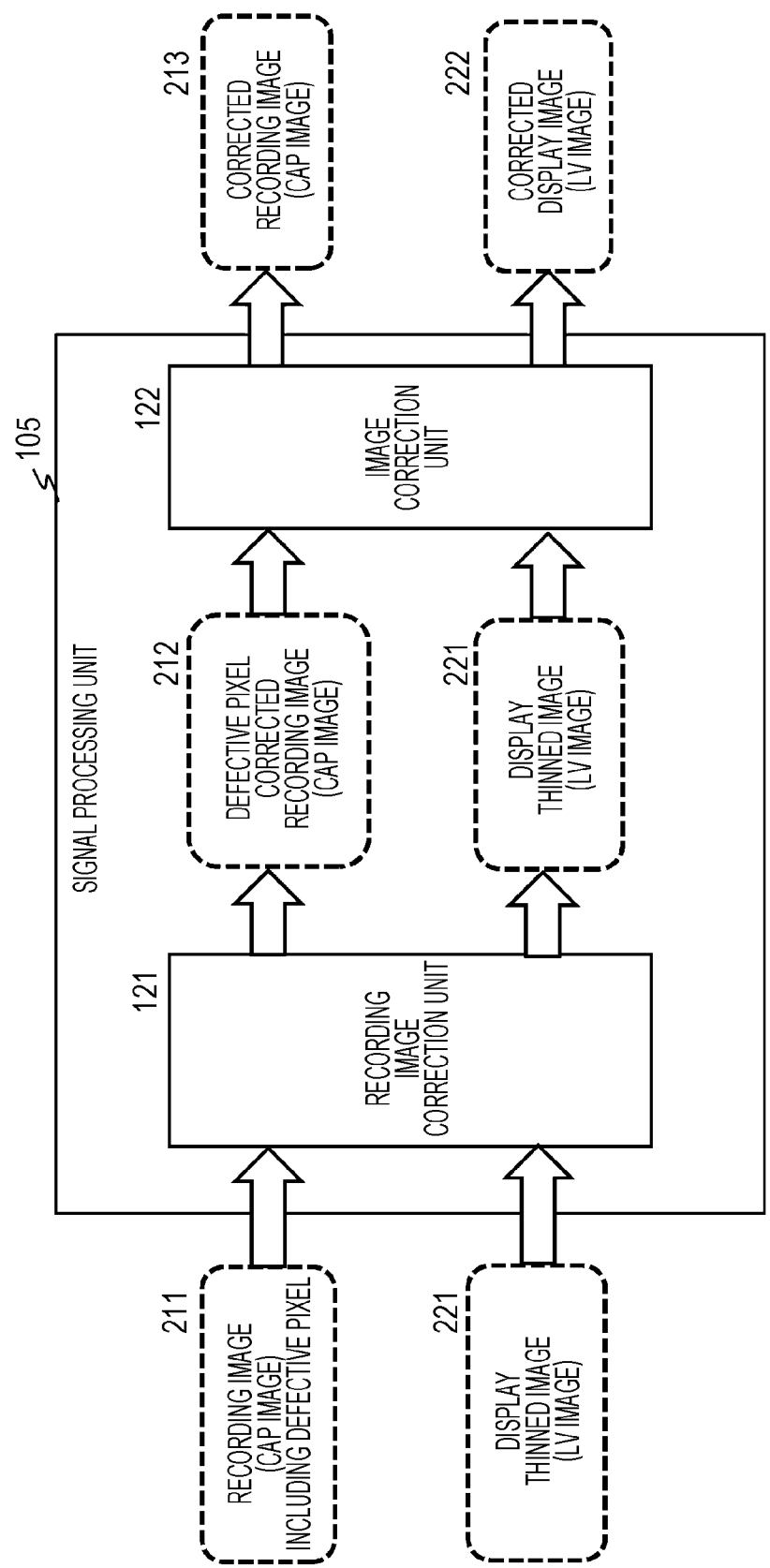
FIG. 7 is a diagram describing a configuration and a processing example of a signal processing unit of the imaging apparatus according to the present disclosure.

FIG. 7 is a diagram showing a specific configuration example of the signal processing unit 105 of the imaging apparatus 100 shown in FIG. 6.

As shown in FIG. 7, the signal processing unit 105 includes a recording image correction unit 121 and an image correction unit 122.

The recording image correction unit 121 performs the correction process of a defective pixel in a recording image described above with reference to FIG. 5.

The image correction unit 122 performs signal processing for a general camera, such as white balance (WB) adjustment and gamma correction.

As shown in FIG. 7, either of the following images is input to the recording image correction unit 121 of the signal processing unit 105 from the frame memory 104:

a recording image (CAP image) 211 including a defective pixel, or a display thinned image (LV image) 221.

The recording image correction unit 121 performs a correction process on the recording image (CAP image) 211 including a defective pixel, performs a process of setting a normal pixel value in the defective pixel, and generates a defective pixel corrected recording image (CAP image) 212.

That is, the recording image correction unit 121 performs the correction process of a defective pixel in a recording image described above with reference to FIG. 5.

The recording image correction unit 121 performs a process of setting a normal pixel value in the defective pixel, generates the defective pixel corrected recording image (CAP image) 212, and outputs the defective pixel corrected recording image (CAP image) 212 to the image correction unit 122.

Note that the recording image correction unit 121 outputs the display thinned image (LV image) 221 to the image correction unit 122 as it is, without performing the process on the display thinned image (LV image) 221.

The image correction unit 122 performs signal processing for a general camera, such as white balance (WB) adjustment and gamma correction, on the defective pixel corrected recording image (CAP image) 212 and the display thinned image (LV image) 221 to generate a corrected recording image (CAP image) 213 and a corrected display image (LV image) 222, so that the corrected recording image (CAP image) 213 and the corrected display image (LV image) 222 are stored in the memory 106 of the imaging apparatus 100 shown in FIG. 6.

A specific configuration and a processing example of the recording image correction unit 121 of the signal processing unit 105 shown in FIG. 7 will be described with reference to FIG. 8 and subsequent drawings.

Figure 8:
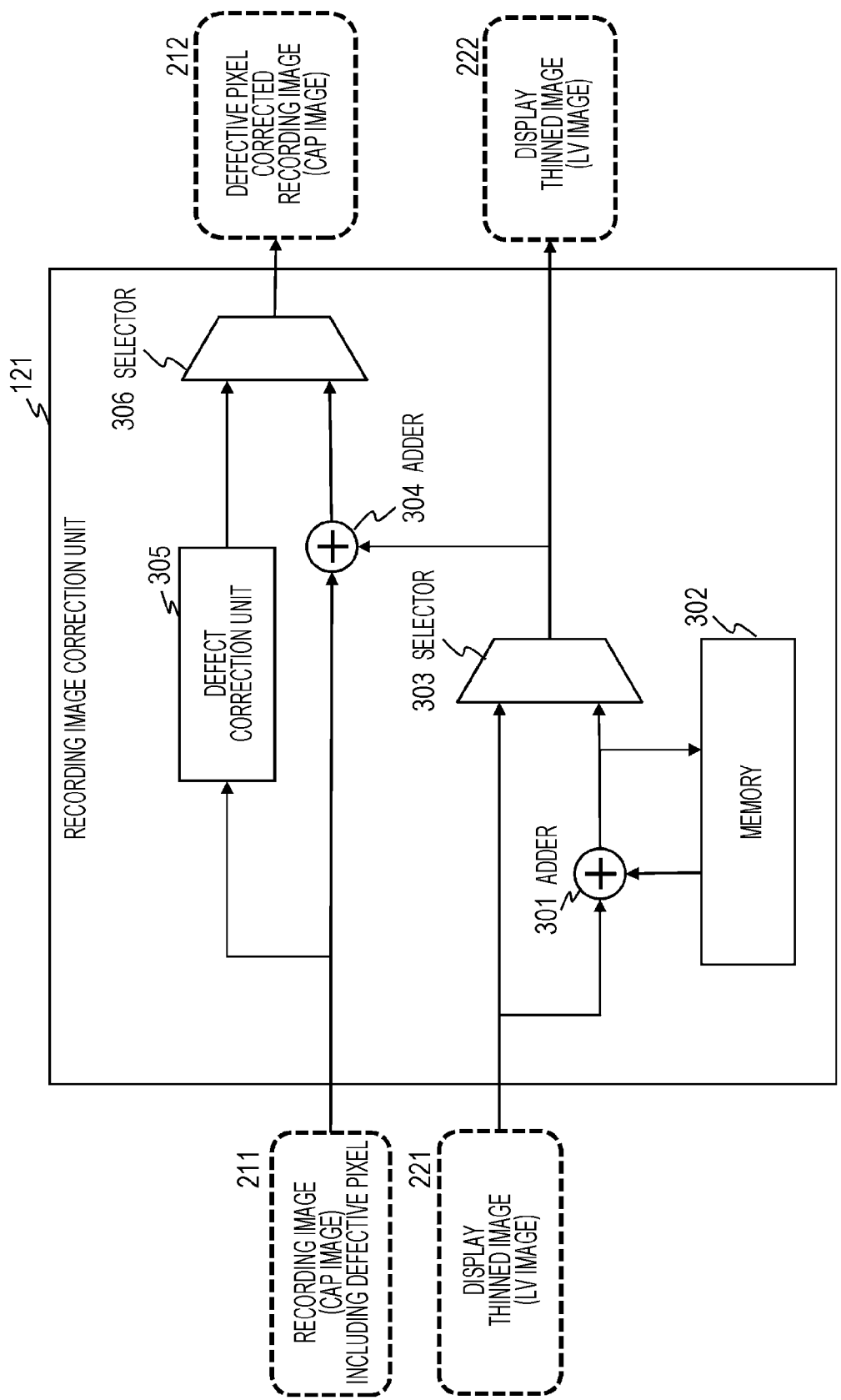
FIG. 8 is a diagram describing the configuration and the processing example of the signal processing unit of the imaging apparatus according to the present disclosure.

As shown in FIG. 8, the recording image correction unit 121 includes an adder 301, a memory 302, a selector 303, an adder 304, a defect correction unit 305, and a selector 306.

A specific example of a process to be performed by use of the recording image correction unit 121 shown in FIG. 8 will be described with reference to FIG. 9 and subsequent drawings.

First, processing of a display image (LV image) to be performed in a period in which a process of imaging, that is, exposing a recording image (CAP image) is not performed will be described with reference to FIG. 9.

Figure 9:
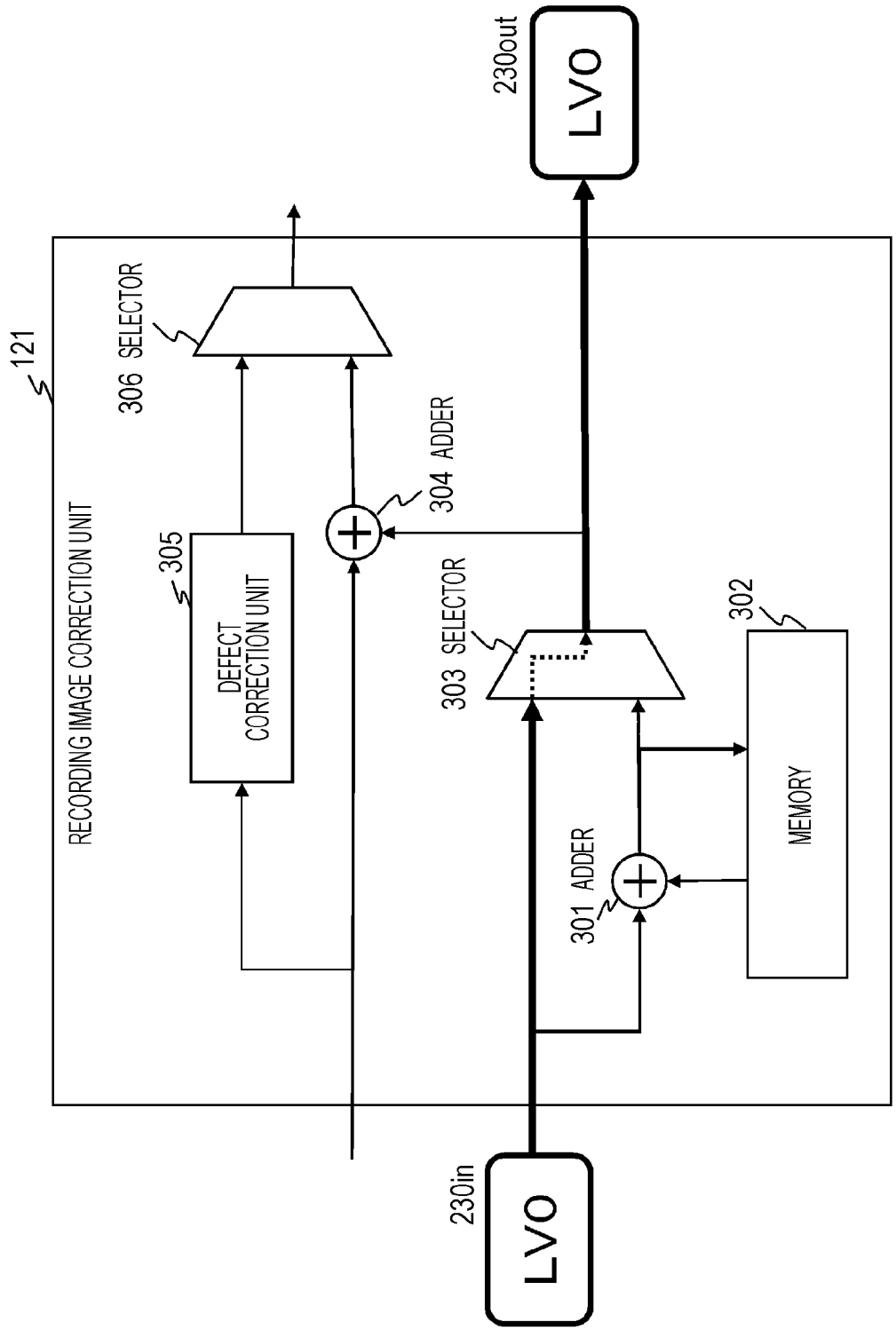
FIG. 9 is a diagram describing the configuration and the processing example of the signal processing unit of the imaging apparatus according to the present disclosure.

FIG. 9 is a diagram showing input and output paths of a display image (LV image) to be used in the period in which a process of imaging, that is, exposing a recording image (CAP image) is not performed.

An image denoted by LV0 and 230in shown in FIG. 9 is a display image (LV) input from the frame memory 104.

Note that the display image (LV image) is a low-pixel image resulting from a thinning process in which only some of the pixels of the imaging element are selectively extracted, as described with reference to FIG. 5.

In a case where the exposure process of the recording image (CAP image) is not performed, the display image (LV0) 230in input from the frame memory 104 is output as it is, via the selector 303. The recording image correction unit 121 outputs a display image (LV0) 230out shown in the drawing to the image correction unit 122 in the signal processing unit 105.

Signal processing for a general camera, such as white balance (WB) adjustment and gamma correction, is performed in the image correction unit 122. As a result, the processed image is displayed on the display unit 107.

Next, processing of a display image (LV image) to be performed in a period in which a process of imaging, that is, exposing a recording image (CAP image) is performed will be described with reference to FIG. 10 and subsequent drawings.

Figure 10:
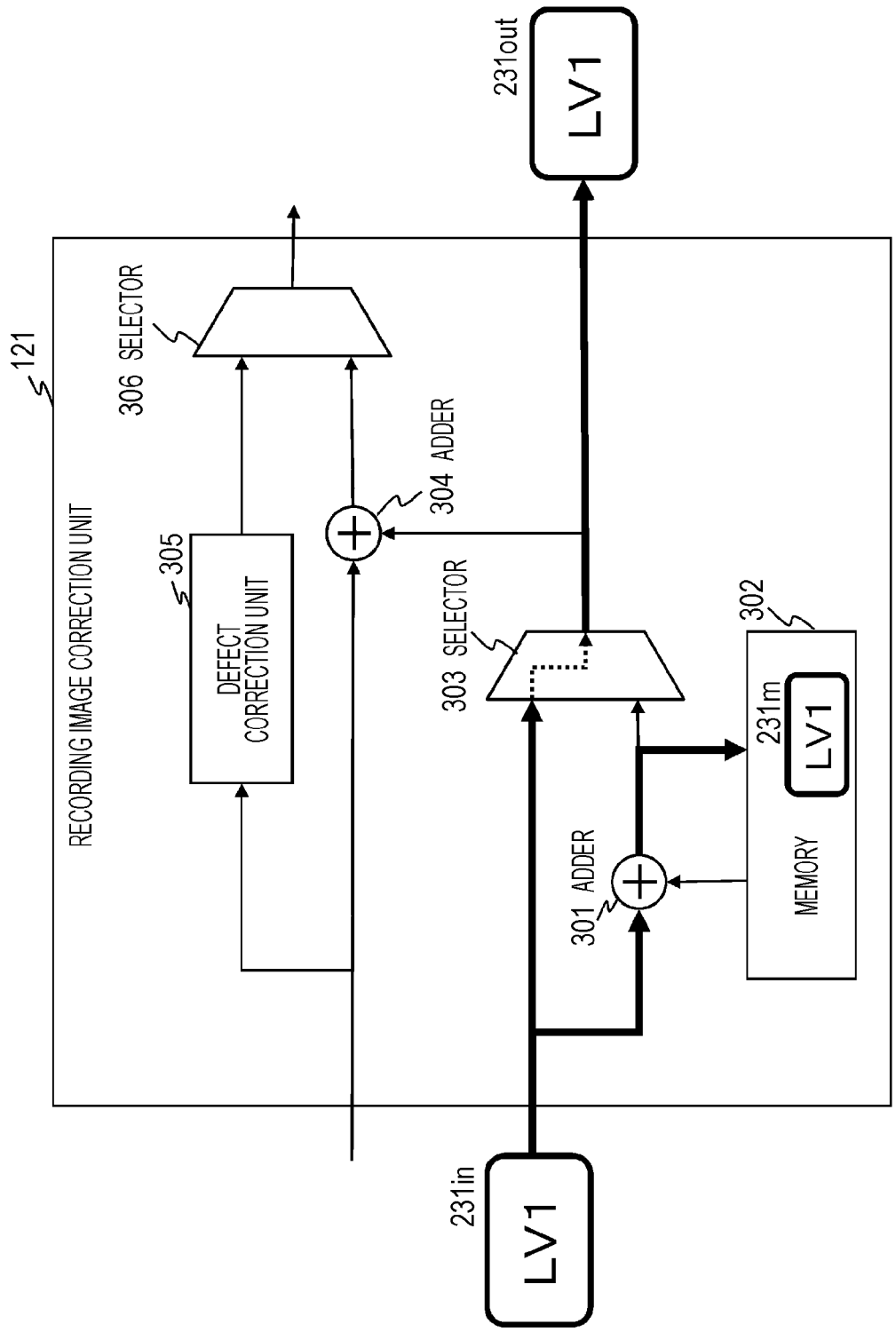
FIG. 10 is a diagram describing the configuration and the processing example of the signal processing unit of the imaging apparatus according to the present disclosure.

FIG. 10 is a diagram showing input and output paths of a display image (LV image) for which exposure for a predetermined period is started at the same timing as the exposure of the recording image (CAP image) is started.

An image denoted by LV1 and 231in shown in FIG. 10 is a display image (LV) input from the frame memory 104.

The display image (LV1) 231in input from the frame memory 104 is output as it is via the selector 303 also in a case where the exposure process of the recording image (CAP image) is started. The recording image correction unit 121 outputs a display image (LV1) 231out shown in the drawing to the image correction unit 122 in the signal processing unit 105.

Signal processing for a general camera, such as white balance (WB) adjustment and gamma correction, is performed in the image correction unit 122. As a result, the processed image is displayed on the display unit 107.

In addition to the above-described process, there is further performed, in the adder 301, a pixel value addition process on the display image (LV1) 231in input from the frame memory 104 and a display image (LV) previously stored in the memory 302, in a case where the exposure process of the recording image (CAP image) is started. Then, the result of addition is stored in the memory 302.

Note that, at this time, there is no display image (LV) previously stored in the memory 302. Thus, a display image (LV1) 231m is stored in the memory 302. The display image (LV1) 231m is identical to the input display image (LV1) 231in.

Note that the display image (LV image) to be stored in the memory 302 is a low-pixel image resulting from the thinning process in which only some of the pixels of the imaging element are selectively extracted, as described with reference to FIG. 5.

Figure 11:
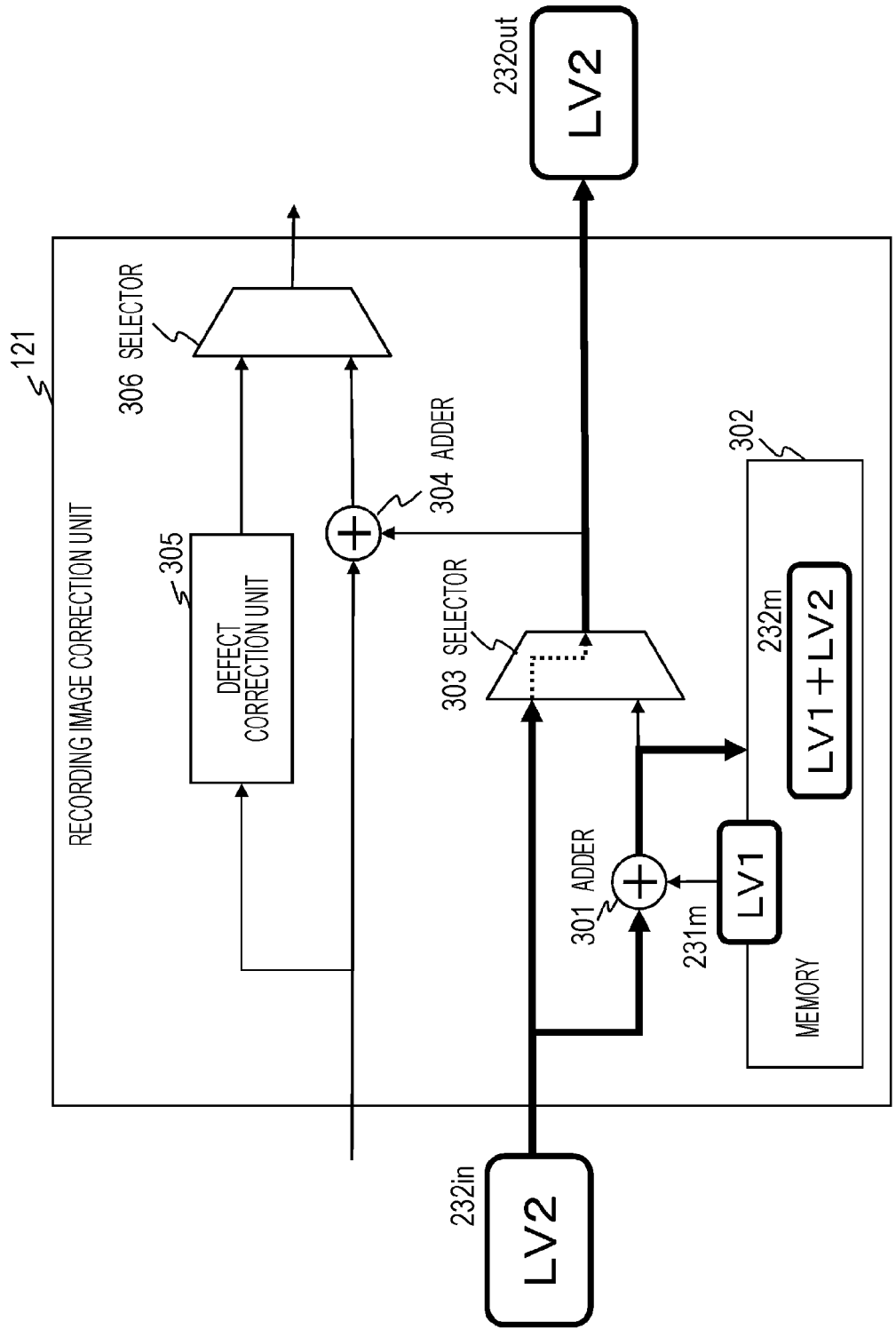
FIG. 11 is a diagram describing the configuration and the processing example of the signal processing unit of the imaging apparatus according to the present disclosure.

Moreover, processing of a display image (LV2) following the display image (LV1) 231 that is the first display image after the start of exposure of the recording image (CAP image) will be described with reference to FIG. 11.

The exposure period of the display image (LV2) also falls within the exposure period of the recording image (CAP image).

A display image (LV2) 232in input from the frame memory 104 is output as it is, via the selector 303. The recording image correction unit 121 outputs a display image (LV2) 232out shown in the drawing to the image correction unit 122 in the signal processing unit 105.

Signal processing for a general camera, such as white balance (WB) adjustment and gamma correction, is performed in the image correction unit 122. As a result, the processed image is displayed on the display unit 107.

Moreover, in addition to the above-described process, there is performed, in the adder 301, the pixel value addition process on the display image (LV2) 232in input from the frame memory 104 and the display image (LV1) previously stored in the memory 302. Then, the result of addition is stored in the memory 302.

Note that, at this time, the display image (LV) previously stored in the memory 302 is LV1.

An image (LV1+LV2) 232m is generated in the adder 301, and stored in the memory. The image (LV1+LV2) 232m is an image obtained by addition of the pixel values of corresponding pixels of the display image (LV1) 231m previously stored in the memory 302 and the display image (LV2) 232in newly input from the frame memory 104.

Next, a display image (LV3) input from the frame memory 104 is also subjected to processing similar to that described with reference to FIG. 11.

As a result of the processing on the display image (LV3), the memory 302 stores an image (LV1+LV2+LV3) on which addition of pixel values has been performed.

Next, processing for a display image (LV4) that is the last display image included in the exposure period of the recording image (CAP image) will be described with reference to FIG. 12.

A display image (LV4) 234in input from the frame memory 104 is output as it is, via the selector 303. The recording image correction unit 121 outputs a display image (LV4) 234out shown in the drawing to the image correction unit 122 in the signal processing unit 105.

Signal processing for a general camera, such as white balance (WB) adjustment and gamma correction, is performed in the image correction unit 122. As a result, the processed image is displayed on the display unit 107.

Moreover, in addition to the above-described process, there is performed, in the adder 301, the pixel value addition process on the display image (LV4) 234in input from the frame memory 104 and the display image (LV1+LV2+LV3) 233m previously stored in the memory 302. Then, the result of addition is stored in the memory 302.

As a result, a pixel value added image (LV1+LV2+LV3+LV4) 234m is stored in the memory 302.

Under the setting described with reference to FIG. 4, the exposure of the recording image (CAP image) ends at the same timing as the exposure of the display image (LV4) ends.

When the exposure of the recording image (CAP image) ends, the recording image (CAP image) is stored in the frame memory 104.

However, as described above with reference to FIG. 5, the recording image (CAP image) stored in the frame memory 104 is an image including a defective pixel, that is, a pixel used for a display image (LV image), which does not have a pixel value corresponding to the exposure period of the recording image (CAP image).

The recording image correction unit 121 of the signal processing unit 105 corrects the defective pixel. That is, the recording image correction unit 121 performs a process of setting the pixel value of the defective pixel to a pixel value corresponding to the exposure period of the recording image (CAP image).

Figure 13:
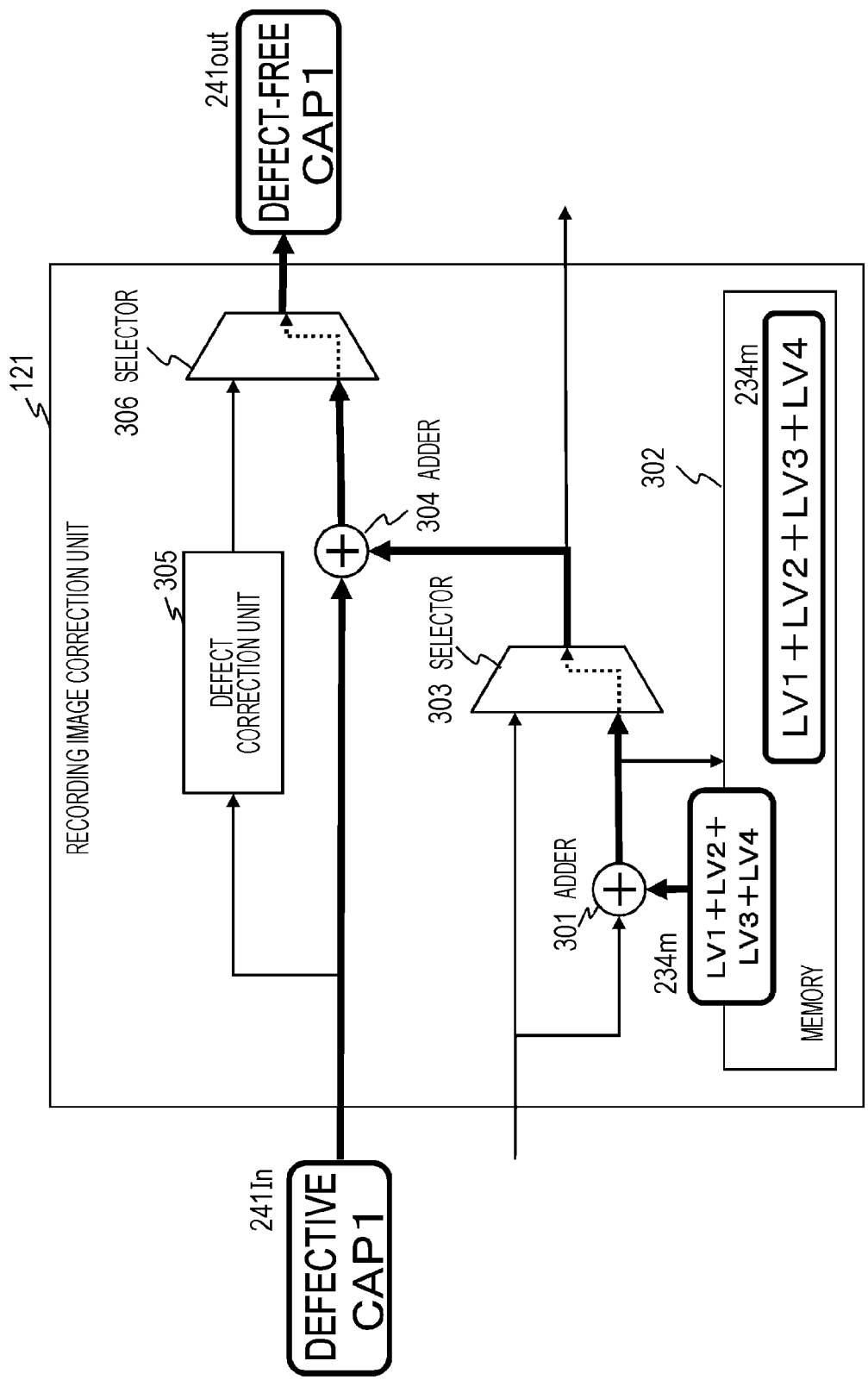
FIG. 13 is a diagram describing the configuration and the processing example of the signal processing unit of the imaging apparatus according to the present disclosure.

Described below with reference to FIG. 13 is a process to be performed by the recording image correction unit 121 of the signal processing unit 105. The recording image correction unit 121 receives an input of a recording image (CAP image) that includes a defective pixel and is stored in the frame memory 104, and corrects the defective pixel.

At the end of an exposure period set in accordance with a shutter speed, a defective recording image (CAP1) 241in stored in the frame memory 104 is input to the recording image correction unit 121 of the signal processing unit 105, as shown in FIG. 13.

The defective recording image (CAP1) 241in is added, in the adder 304, to the display image added image (LV1+LV2+LV3+LV4) 234m stored in the memory 302.

The display image added image (LV1+LV2+LV3+LV4) 234m is the sum of the pixel values of the display images generated by the exposure process during the exposure period of the defective recording image (CAP1) 241in. That is, the display image added image (LV1+LV2+LV3+LV4) 234m is an image including only the LV pixel output pixels 51 described with reference to FIG. 5.

That is, the pixels included in the display image added image (LV1+LV2+LV3+LV4) 234m have pixel values generated by an exposure process in the same exposure period as the exposure period of the defective recording image (CAP1) 241in.

However, the display image added image (LV1+LV2+LV3+LV4) 234m includes only the LV pixel output pixels 51 described with reference to FIG. 5.

Meanwhile, pixel values corresponding to the exposure period of the recording image (CAP image) set in accordance with the shutter speed are set in the pixels of the defective recording image (CAP1) 241in other than the LV pixel output pixels 51 described with reference to FIG. 5. However, the pixel values corresponding to the exposure period of the recording image (CAP image) set in accordance with the shutter speed are not set in the LV pixel output pixels 51.

The adder 304 performs a process of adding the pixel value of the display image added image (LV1+LV2+LV3+LV4) 234m read from the memory 302 to a pixel value at the position of the LV pixel output pixel 51 in the defective recording image (CAP1) 241in.

As a result of this process, the pixel value at the position of the LV pixel output pixel 51 in the defective recording image (CAP1) 241in is corrected to the pixel value corresponding to the exposure period of the recording image (CAP image) set in accordance with the shutter speed.

A recording image (CAP image) subjected to a correction process in this addition process is output via the selector 306.

FIG. 13 shows a defect-free recording image (CAP1) 241out.

The defect-free recording image (CAP1) 241out shown in FIG. 13 is output to the image correction unit 122 in the signal processing unit 105. The defect-free recording image (CAP1) 241out is subjected to signal processing for a general camera, such as white balance (WB) adjustment and gamma correction, in the image correction unit 122, and then stored in the recording unit 108.

As described above, the imaging apparatus according to the present disclosure generates and displays a display image (LV image) on the display unit even during the exposure period of a recording image (CAP image), and also stores the added pixel values of display images (LV images) generated in the exposure period of the recording image (CAP image) in the memory.

When the exposure period of the recording image (CAP image) ends, the recording image (CAP image) is corrected by use of the added pixel values of the display images (LV images) stored in the memory.

This series of processes enables a display image (LV image) to be continuously displayed on the display unit during the exposure period of a recording image (CAP image), and also enables a high-quality recording image to be generated and recorded in which the similar pixel values as those in the case of performing an exposure process for the exposure period set in accordance with the shutter speed are set in all pixels including the pixels of the recording image (CAP image).

The process of storing the display images (LV1 to LV4) in the memory 302 and an example of the process of displaying the display images (LV1 to LV4) on the display unit 107 have been described with reference to FIGS. 10 to 12. The process example has been described above on the basis of the assumption that an image input to the recording image correction unit 121 is output as a display image (LVn) to the display unit 107, as it is, via the selector 303.

Described below is an example of a process of displaying an image in a manner different from the above-described process.

An added image stored in the memory 302 is displayed on the display unit 107 in the process example to be described below. This process example will be described with reference to FIG. 14 and subsequent drawings.

Figure 14:
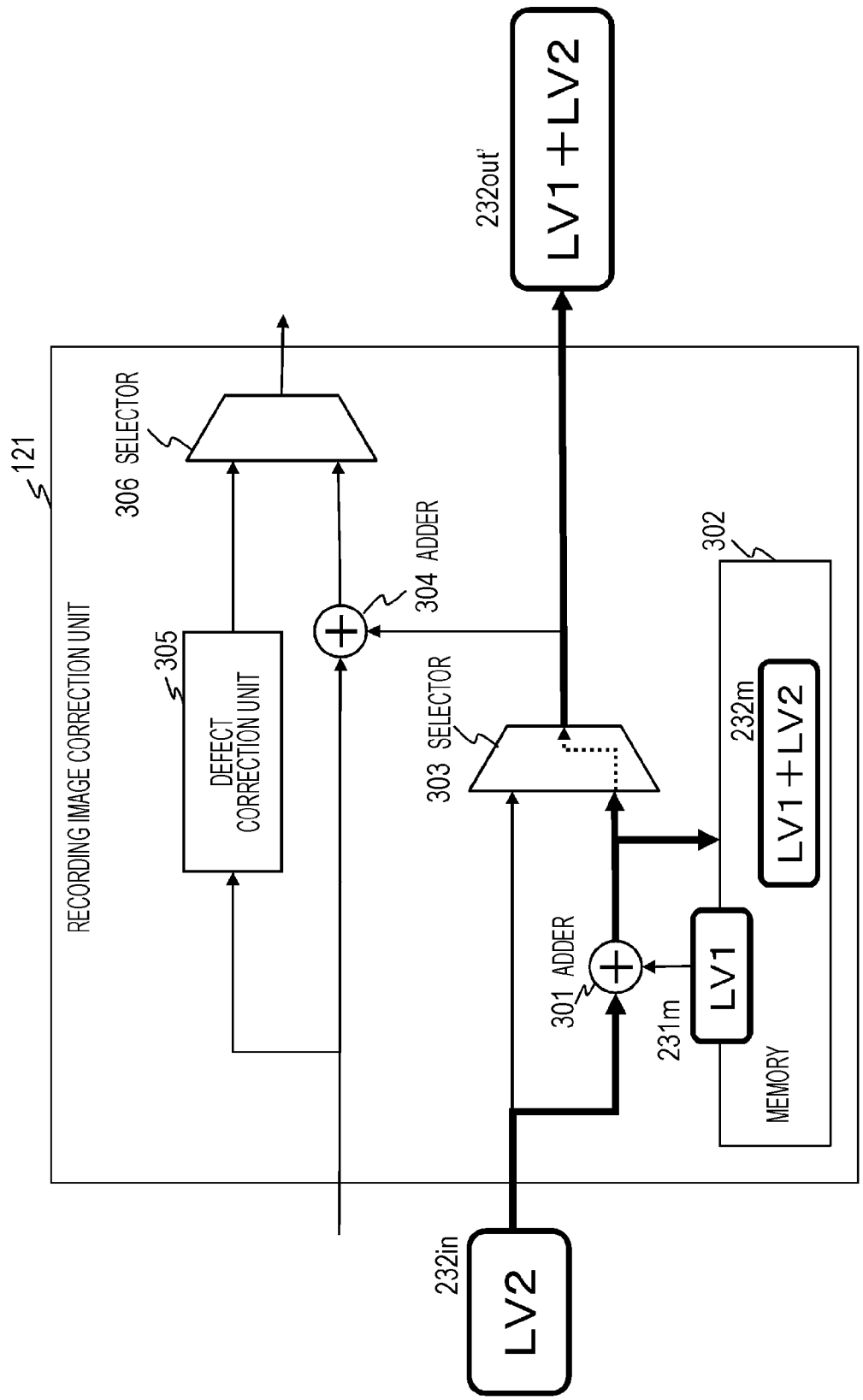
FIG. 14 is a diagram describing the configuration and a processing example of the signal processing unit of the imaging apparatus according to the present disclosure.

FIG. 14 shows an example of displaying an added image processed at a timing similar to the timing of processing of the display image (LV2) described above with reference to FIG. 11.

In the example described above with reference to FIG. 11, the display image (LV2) 232in input from the frame memory 104 is output as it is via the selector 303 and displayed on the display unit 107.

Meanwhile, in the process example shown in FIG. 14, the display image (LV2) 232in input from the frame memory 104 and the display image (LV1) previously stored in the memory 302 are subjected to the pixel value addition process in the adder 301. Then, an addition result (LV1+LV2) is output as a display image via the selector 303.

The recording image correction unit 121 outputs a display image (LV1+LV2) 232out' shown in the drawing to the image correction unit 122 in the signal processing unit 105.

Signal processing for a general camera, such as white balance (WB) adjustment and gamma correction, is performed in the image correction unit 122. As a result, the processed image is displayed on the display unit 107.

Thus, the present process example is not based on a configuration in which the display image (LV2) 232in input from the frame memory 104 is displayed on the display unit 107. Instead, the pixel values of the display image (LV2) 232in and the display image (LV1) 231m previously stored in the memory 302 are added, and the generated result of addition is output as the display image (LV1+LV2) 232out' and displayed on the display unit 107.

Subsequently, a similar process is also performed on the display images (LV3 and LV4) input to the recording image correction unit 121.

Figure 12:
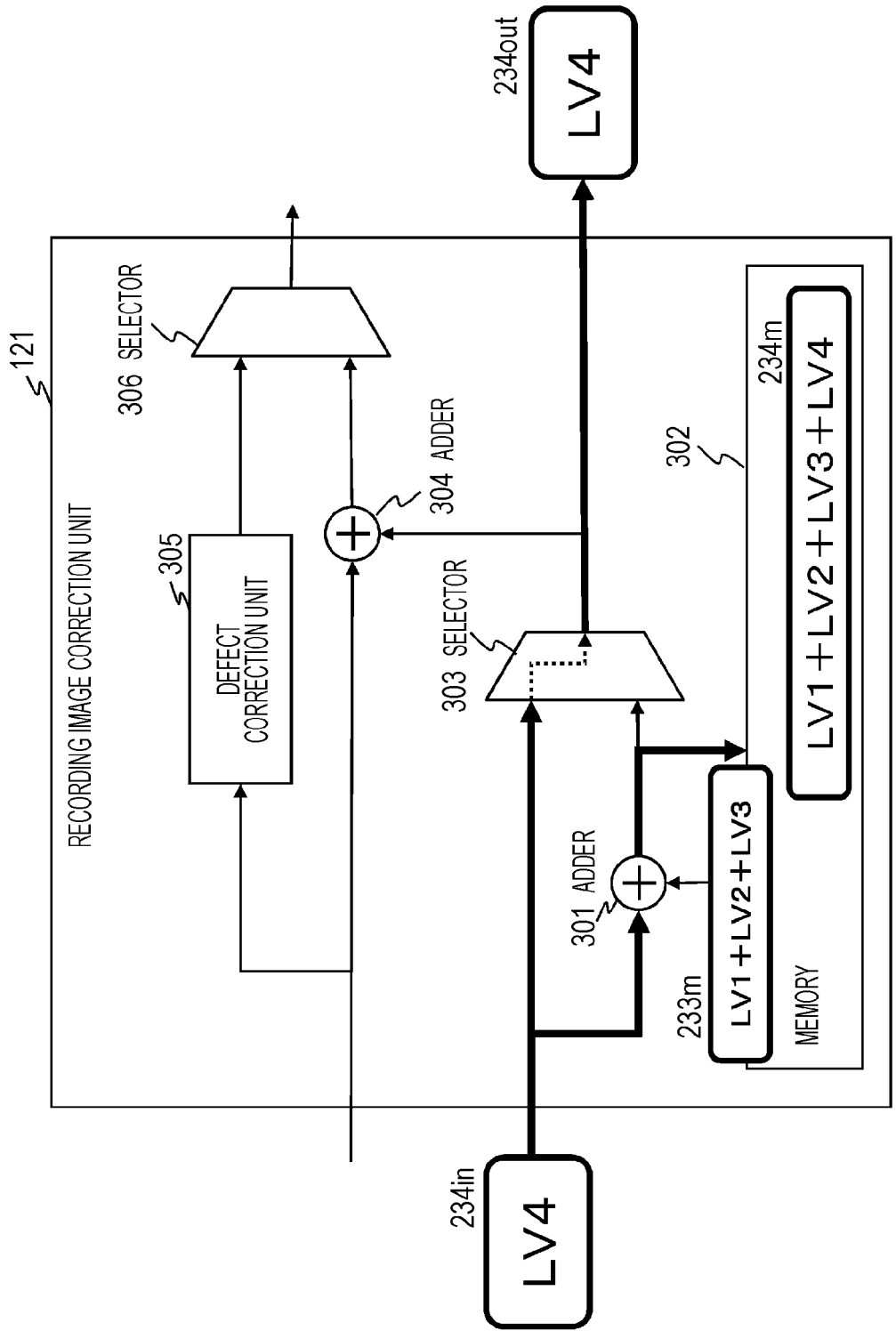
FIG. 12 is a diagram describing the configuration and the processing example of the signal processing unit of the imaging apparatus according to the present disclosure.

For example, under the setting of FIG. 12 described above, the display image (LV4) 234in input from the frame memory 104 is output as it is via the selector 303 and displayed on the display unit 107.

Figure 15:
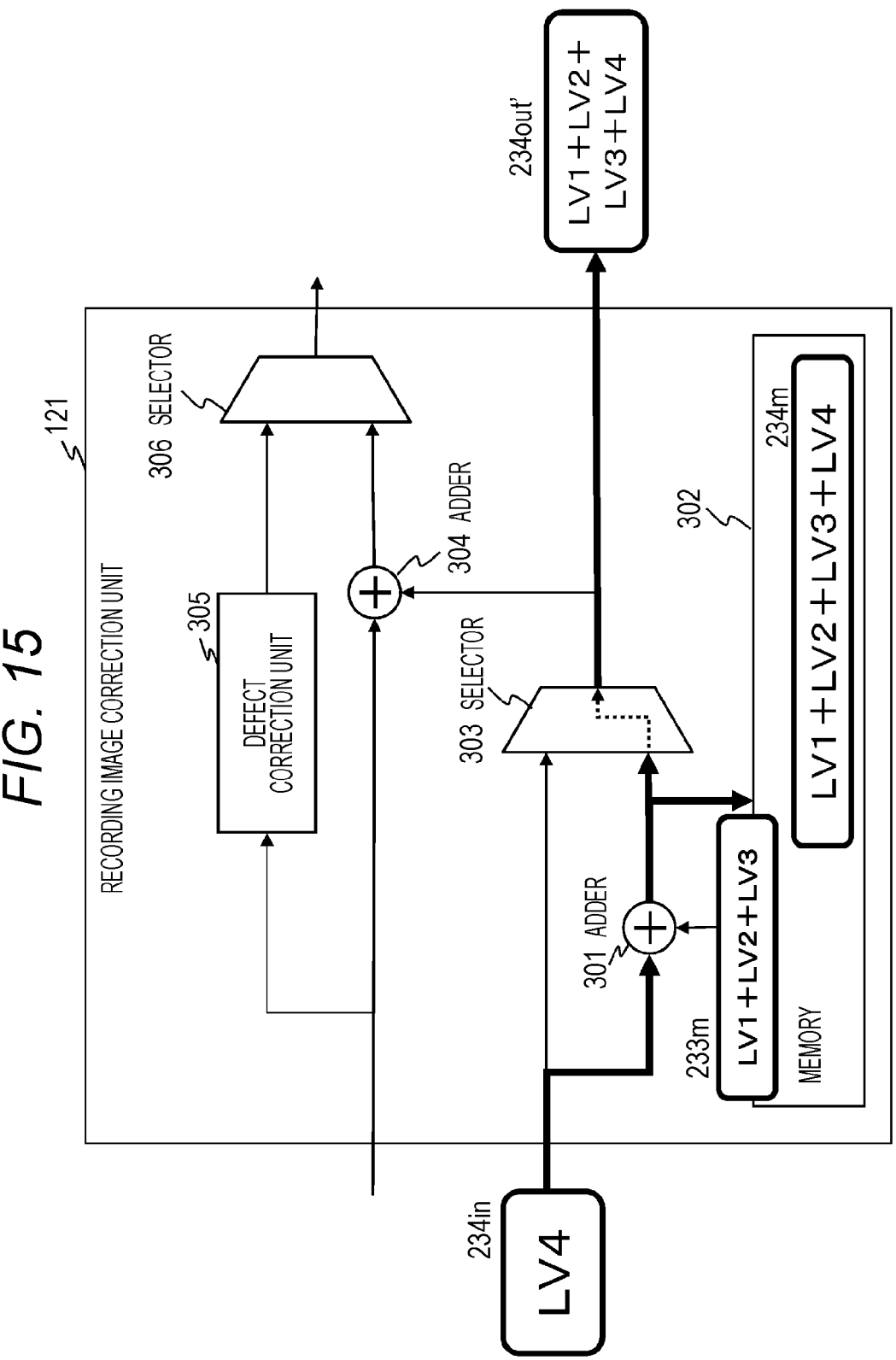
FIG. 15 is a diagram describing the configuration and the processing example of the signal processing unit of the imaging apparatus according to the present disclosure.

FIG. 15 is an example of a process of displaying an added image processed at a timing similar to the timing of processing of the display image (LV4) described above with reference to FIG. 12.

In the process example shown in FIG. 15, the display image (LV4) 234in input from the frame memory 104 and the display image (LV1+LV2+LV3) 233m previously stored in the memory 302 are subjected to the pixel value addition process in the adder 301. Then, an addition result (LV1+LV2+LV3+LV4) is output as a display image via the selector 303.

As described above, it is also possible to adopt a configuration in which the result of addition is used as a display image to be output to the display unit.

Note that another configuration may also be adopted such that it is possible to switch, in response to a user input, between the setting for separately outputting the display images (LV1 to LV4) to the display unit 107 as described above with reference to FIGS. 10 to 12 and the setting for outputting the result of addition of the display images (LV1 to LV4) to the display unit 107 as described above with reference to FIGS. 14 and 15.

No matter which process is selected, it is possible to continuously display a display image (LV image) on the display unit during the exposure period of a recording image (CAP image), and also to generate and record a high-quality recording image in which the similar pixel values as those in the case of performing an exposure process for the exposure period set in accordance with the shutter speed are set in all pixels including the pixels of the recording image (CAP image).

Note that the timings of starting and ending exposure of a recording image (CAP image) coincide with the timings of starting and ending exposure of display images (LV images) in the process examples of the recording image correction unit 121 described with reference to FIG. 4 and FIGS. 9 to 15. However, these timings do not always coincide with each other.

Figure 16:
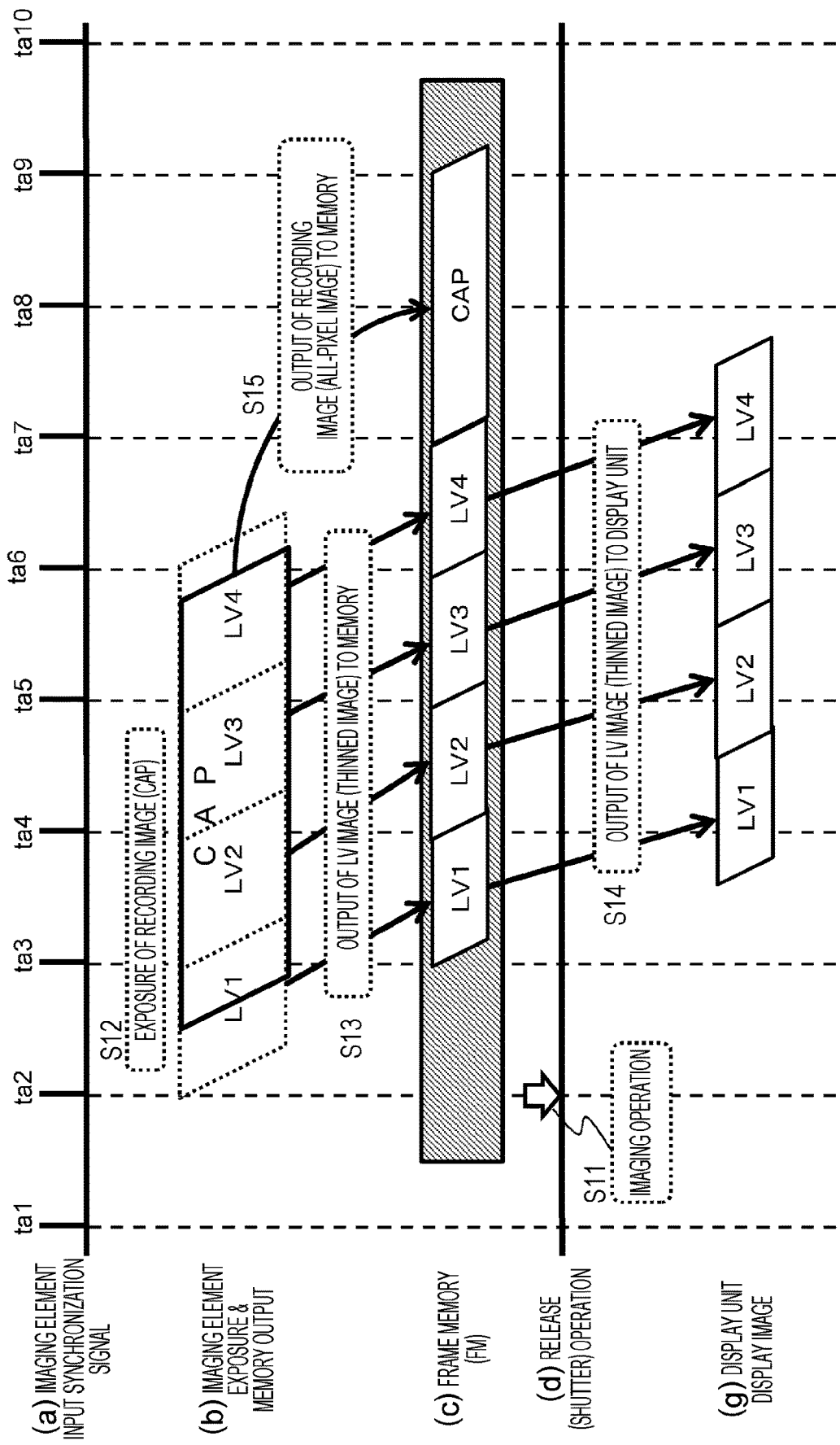
FIG. 16 is a diagram describing an example in which a timing of starting exposure of a recording image (CAP image) is set such that the exposure of the recording image (CAP image) starts in a period of an exposure process of a prescribed display image (LV).

For example, as shown in FIG. 16, there may be a case where the timing of starting exposure of the recording image (CAP image) is set such that the exposure of the recording image (CAP image) starts in the period of the exposure process of the prescribed display image (LV1).

Similarly, there may be a case where the timing of ending exposure of the recording image (CAP image) is set such that the exposure of the recording image (CAP image) ends in the period of the exposure process of the prescribed display image (LV1).

In such cases, correct pixel values cannot be set in the processes described with reference to FIGS. 10 to 13.

A configuration example for solving this problem will be described with reference to FIG. 17.

Figure 17:
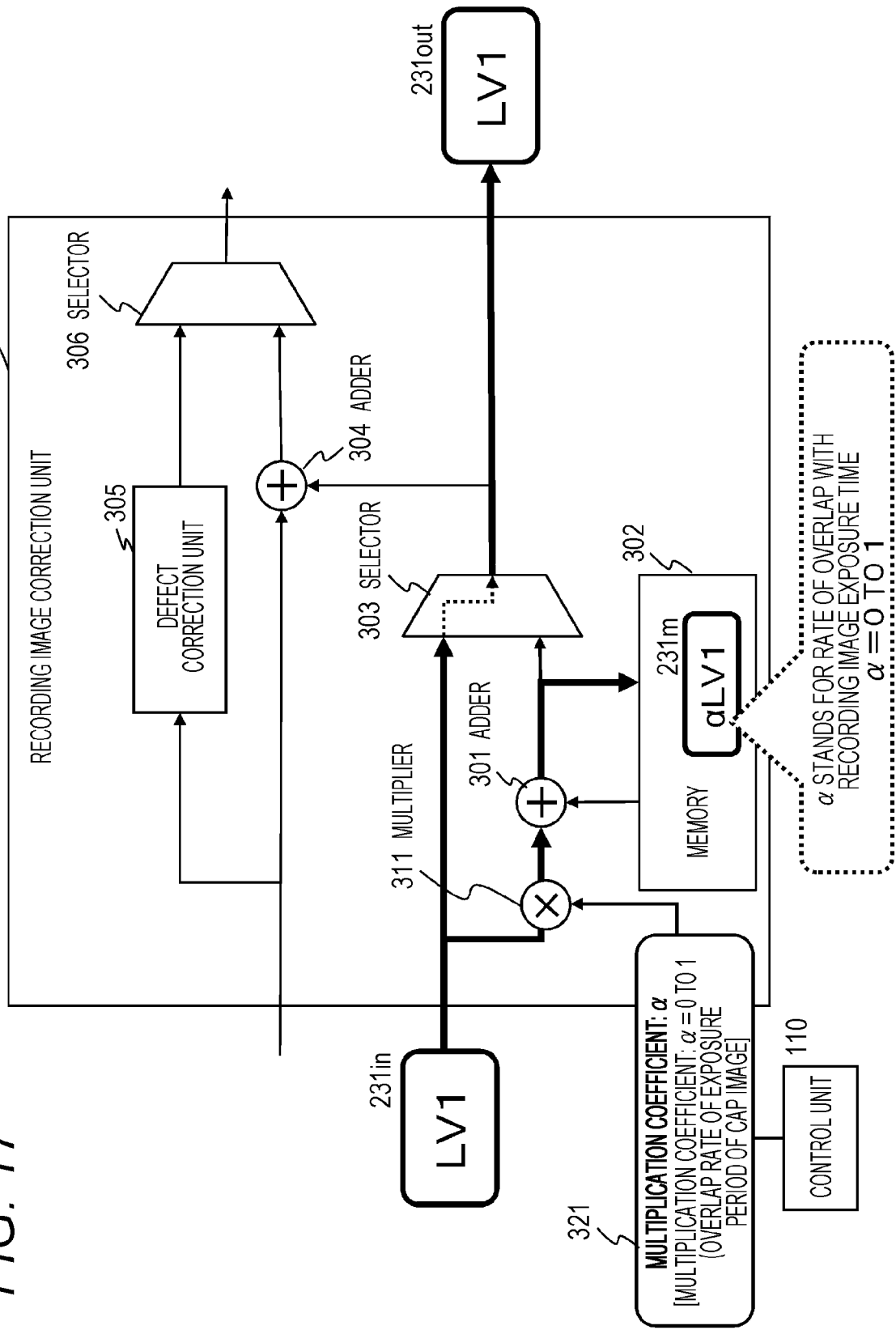
FIG. 17 is a diagram describing a processing example of the signal processing unit in a case where the timing of starting exposure of the recording image (CAP image) is set such that the exposure of the recording image (CAP image) starts in the period of the exposure process of the prescribed display image (LV).

FIG. 17 is a diagram describing processing of the display image (LV1) shown in FIG. 16 to be performed by the recording image correction unit 121.

As shown in FIG. 16, the timing of starting exposure of the recording image (CAP image) is set such that the exposure of the recording image (CAP image) starts in the period of the exposure process of the prescribed display image (LV1).

In this case, if the pixel value of the display image (LV1) is stored in the memory 302 and added to the pixel values of the subsequent display images (LV2, 3, . . . ), there is stored, in the memory 302, a pixel value resulting from an exposure process performed for a period longer than the exposure period of the recording image (CAP image) shown in FIG. 16.

In order to prevent such a situation, the control unit 110 shown in FIG. 17 calculates a multiplication parameter α (α=0 to 1) corresponding to the rate of overlap between the exposure period of the display image (LV1) 231in input from the frame memory 104 and the exposure period of the recording image (CAP image). Then, the pixel value of the display image (LV1) 231in input from the frame memory 104 is multiplied by the multiplication parameter α (α=0 to 1) in a multiplier 311, so that a result is output to the adder 301 and the memory 302.

The multiplication parameter α is set to a value in the range of 0 to 1.

In a case where the rate of overlap between the exposure period of the display image (LV) and the exposure period of the recording image (CAP image) is 100%, a is set such that α=1. In a case where the overlap rate is 0%, α is set such that α=0.

It is possible to adjust the pixel values of the addition value of the display images to be stored in the memory 302 such that the pixel values are changed to pixel values to be obtained as a result of the exposure process performed in a period that coincides with the exposure period of the recording image (CAP image), by performing such a multiplication process.

Figure 18:
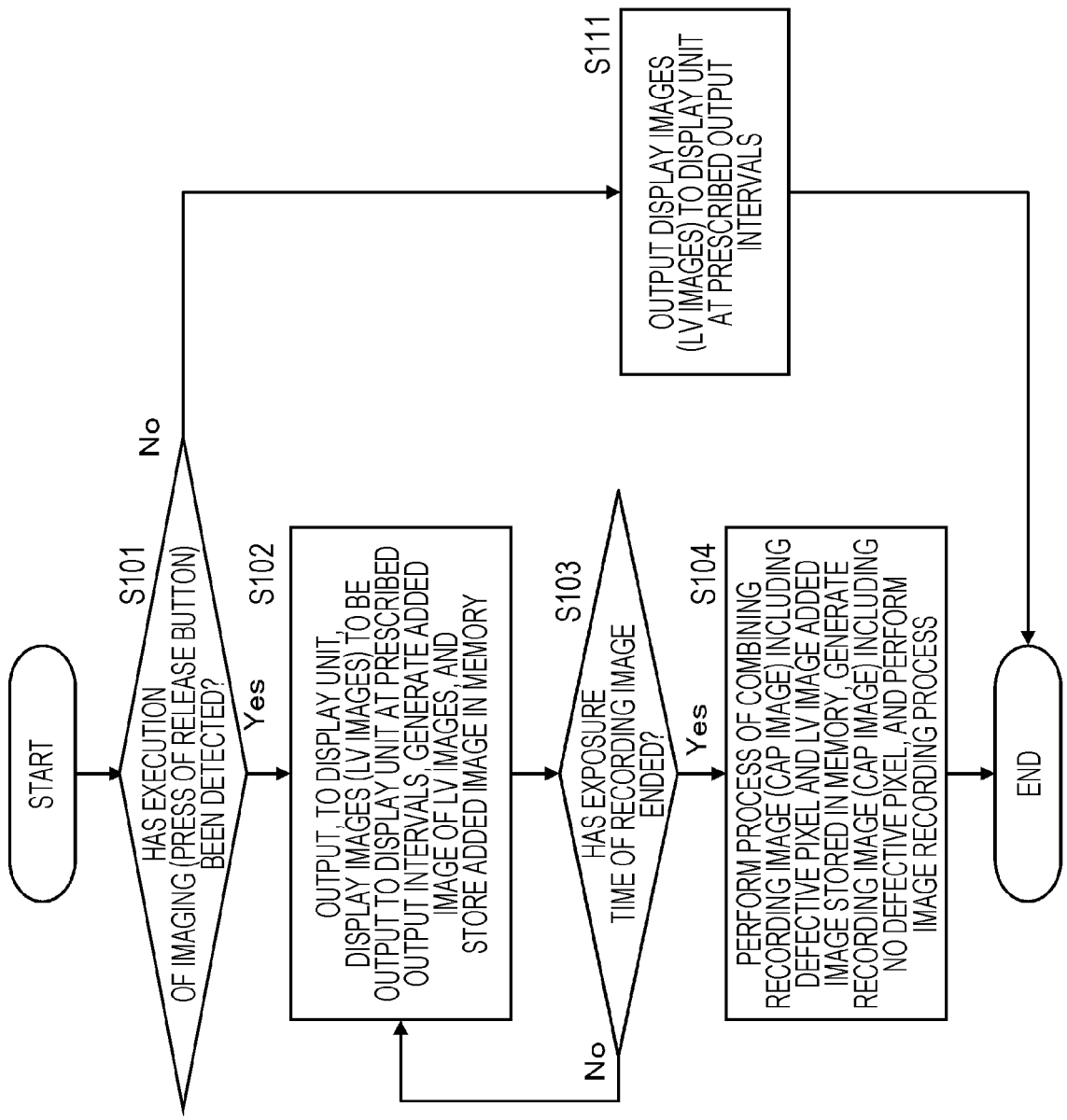
FIG. 18 is a diagram showing a flowchart describing a process sequence to be performed by the imaging apparatus.

Next, with reference to a flowchart shown in FIG. 18, the following describes a processing sequence of the above-described correction process of a defective pixel in the recording image (CAP image), to be performed by use of the added pixel values of the display images (LV images) stored in the memory.

Note that the process according to the flowchart shown in FIG. 18 is performed according to, for example, a program stored in the storage unit of the imaging apparatus, under the control of the control unit that includes a CPU or the like having a program execution function.

The process of each step of the flowchart shown in FIG. 18 will be described below in sequence.

(Step S101)

First, in step S101, the control unit of the imaging apparatus determines whether or not imaging has been performed (the release button has been pressed).

In a case where it is determined that imaging has been performed (the release button has been pressed), the process proceeds to step S102.

Meanwhile, in a case where it is determined that imaging has not been performed, the process proceeds to step S111.

(Step S102)

In a case where it is determined in step S101 that imaging has been performed (the release button has been pressed), the process proceeds to step S102.

In step S102, there is performed a process of displaying, on the display unit, display images (LV images) to be output to the display unit at prescribed output intervals, and also storing an added image of the display images (LV images) in the memory.

This process is performed by use of the configuration of the recording image correction unit 121 described above with reference to FIGS. 8 to 17.

(Step S103)

Next, in step S103, the control unit determines whether or not the exposure period of the recording image (CAP image) has ended.

In a case where it is determined that the exposure period of the recording image (CAP image) has not ended, the process of step S102 is continued.

Meanwhile, in a case where it is determined that the exposure period of the recording image (CAP image) has ended, the process proceeds to step S104.

(Step S104)

In a case where it is determined in step S103 that the exposure period of the recording image (CAP image) has ended, the process proceeds to step S104. In step S104, there is performed a process of combining the recording image (CAP image) including a vascular pixel and the added image of the display images (LV images) stored in the memory, to generate a defect-free recording image (CAP image) in which the pixel value of the defective pixel has been corrected, and an image recording process is performed.

This process is performed by use of the configuration of the recording image correction unit 121 described above with reference to FIGS. 8 to 17.

(Step S111)

In a case where it is determined in step S101 that imaging has not been performed (the release button has not been pressed), the process proceeds to step S111.

In step S111, there is performed a process of displaying the display images (LV images) on the display unit.

This process is performed by use of the configuration of the recording image correction unit 121 described above with reference to FIG. 9.

5. Processing Example in Case of Imaging Apparatus with Mechanical Shutter

Next, the following describes a processing example in the case of an imaging apparatus including a mechanical shutter.

Imaging apparatuses include an electronic shutter type imaging apparatus and a mechanical shutter type imaging apparatus. The electronic shutter type imaging apparatus electronically performs a shutter operation when capturing an image. The mechanical shutter type imaging apparatus performs a shutter operation as a mechanical operation.

In either case of the electronic shutter type imaging apparatus or the mechanical shutter type imaging apparatus, a process of exposing an imaging element and a process of reading exposed pixels are sequentially performed from an upper line toward a lower line of the imaging element.

In the case of the electronic shutter type imaging apparatus, it is possible to cause the speed of the process (reading process) of reading exposed pixels to be identical to the starting (or ending) speed of electronic shutter-driven exposure from the upper line to the lower line of the imaging element after a reset process (a process of discharging electric charges from the imaging element) prior to the start of the process of exposing the imaging element.

That is, it is possible to cause a slope from the upper line to the lower line corresponding to a process of reading each display image (LVn) to be identical to a slope from the upper line to the lower line of the exposure process of the recording image (CAP) shown in the field of (b) imaging element exposure & memory output process of FIGS. 4 and 16 described above.

However, in the case of the mechanical shutter type imaging apparatus, it is difficult to cause the speed of the process (reading process) of reading exposed pixels to be identical to the starting (or ending) speed of electronic shutter-driven exposure from the upper line to the lower line of the imaging element after the reset process (the process of discharging electric charges from the imaging element) prior to the start of the process of exposing the imaging element.

An example of the exposure process of a recording image (CAP) in a mechanical shutter type imaging apparatus will be described with reference to FIG. 19.

Figure 19:
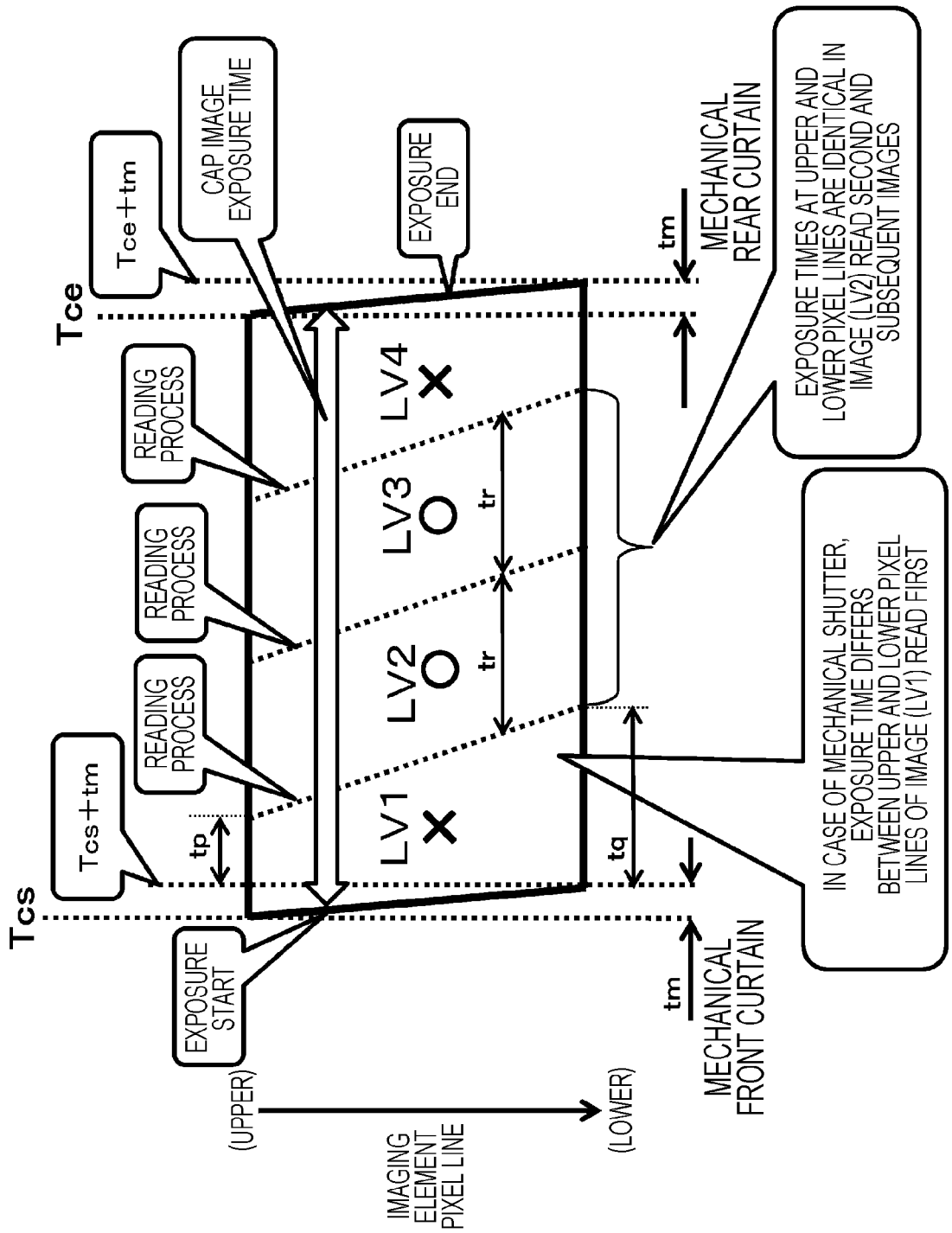
FIG. 19 is a diagram describing a process to be performed by an imaging apparatus including a mechanical shutter.

FIG. 19 is a diagram showing a processing example in a case where the mechanical shutter type imaging apparatus performs a process similar to the exposure process of the recording image (CAP) of the electronic shutter type imaging apparatus described above, that is, the exposure process of the recording image (CAP) shown in the field of (b) imaging element exposure & memory output process of FIGS. 4 and 16.

The exposure process of the recording image (CAP) starts at time Tcs, and ends at time Tce.

Note that these times Tcs and Tce stand for the start time and end time of exposure of the uppermost pixel line of the imaging element, respectively. This is a process of a mechanical front curtain shown in the drawing.

The start time and end time of exposure of the lowermost pixel line of the imaging element are each delayed by a time (tm) depending on a mechanical shutter drive time such that exposure start time=Tcs+tm and exposure end time=Tce+tm. This is a process of a mechanical rear curtain shown in the drawing.

Moreover, it is assumed that a process of sequentially reading the plurality of display images (LV1 to LV4) is performed in the exposure period of the recording image (CAP).

The process (reading process) of reading exposed pixels from the imaging element is sequentially performed from the uppermost pixel line toward the lowermost pixel line of the imaging element in accordance with dotted lines of [reading process] shown in FIG. 19.

As can be understood from FIG. 19, the slopes of the dotted lines of [reading process] are more gradual than slopes (Tcs to Tcs+m, and Tce to Tce+m) indicated by solid lines at the time of [exposure start] and [exposure end] of the recording image (CAP).

That is, the starting (ending) speed of exposure from the upper line to the lower line of the imaging element is not identical to the speed of the process (reading process) of reading exposed pixels.

If the display image (LV1) generated immediately after the start of the exposure process of the recording image (CAP) is read in such a situation, the exposure time of the uppermost pixel line of the display image (LV1) is tp, while the exposure time of the lowermost pixel line thereof is tq which is longer than tp, as shown in FIG. 19. Thus, exposure time varies depending on pixel positions in the image.

Moreover, the same applies to the display image (LV4) generated immediately before the end of the exposure process of the recording image (CAP). That is, there is a problem that exposure time varies depending on pixel positions in the image.

Such a problem occurs in the case of a mechanical shutter.

Therefore, the imaging apparatus using a mechanical shutter does not perform a process of displaying the display image (LV1) generated immediately after the start of the exposure process of the recording image (CAP) and the display image (LV4) generated immediately before the end of the exposure process of the recording image (CAP). Instead, the imaging apparatus using a mechanical shutter performs a process of selecting and displaying display images other than these images on both sides.

As can be understood from FIG. 19, the second and subsequent display images (LV2) generated after the start of the exposure process of the recording image (CAP) are normal images with an exposure time kept constant at tr regardless of pixel positions.

Note that the imaging apparatus using a mechanical shutter also performs a process similar to that of the imaging apparatus using an electronic shutter described above with reference to FIGS. 9 to 18 except that the imaging apparatus using a mechanical shutter does not perform a process of displaying the display image (LV1) generated immediately after the start of the exposure process of the recording image (CAP) and the display image (LV4) generated immediately before the end of the exposure process of the recording image (CAP) as described above.

That is, the imaging apparatus using a mechanical shutter stores, in the memory 302, the result of addition of the pixel values of all the display images (LV1 to LV4) during the period of the exposure process of the recording image (CAP), performs a process of correcting the recording image (CAP) by using the result of addition of the pixel values stored in the memory 302, and outputs the recording image (CAP).

6. Embodiment of Correcting Defective Pixel in Recording Image on Basis of Pixel Values of Pixels Surrounding Defective Pixel In the above-described embodiment, there is performed a process of accumulating and adding the pixel values of display images during the exposure period of the recording image to correct the pixel value of a defective pixel in the recording image.

Next, the following describes an embodiment in which a process of correcting a defective pixel in a recording image is performed without using the result of accumulation and addition of the pixel values of display images during the exposure period of the recording image.

Specifically, there are ten examples in which a defective pixel in the recording image is corrected on the basis of the pixel values of pixels surrounding the defective pixel.

Note that an imaging apparatus according to the present embodiment also has a configuration described with reference to FIG. 6. Furthermore, as in the configuration described above with reference to FIG. 7, a signal processing unit 105 includes a recording image correction unit 121 and an image correction unit 122 also in the present embodiment.

The configuration of the recording image correction unit 121 is similar to the configuration described with reference to FIG. 8.

Figure 20:
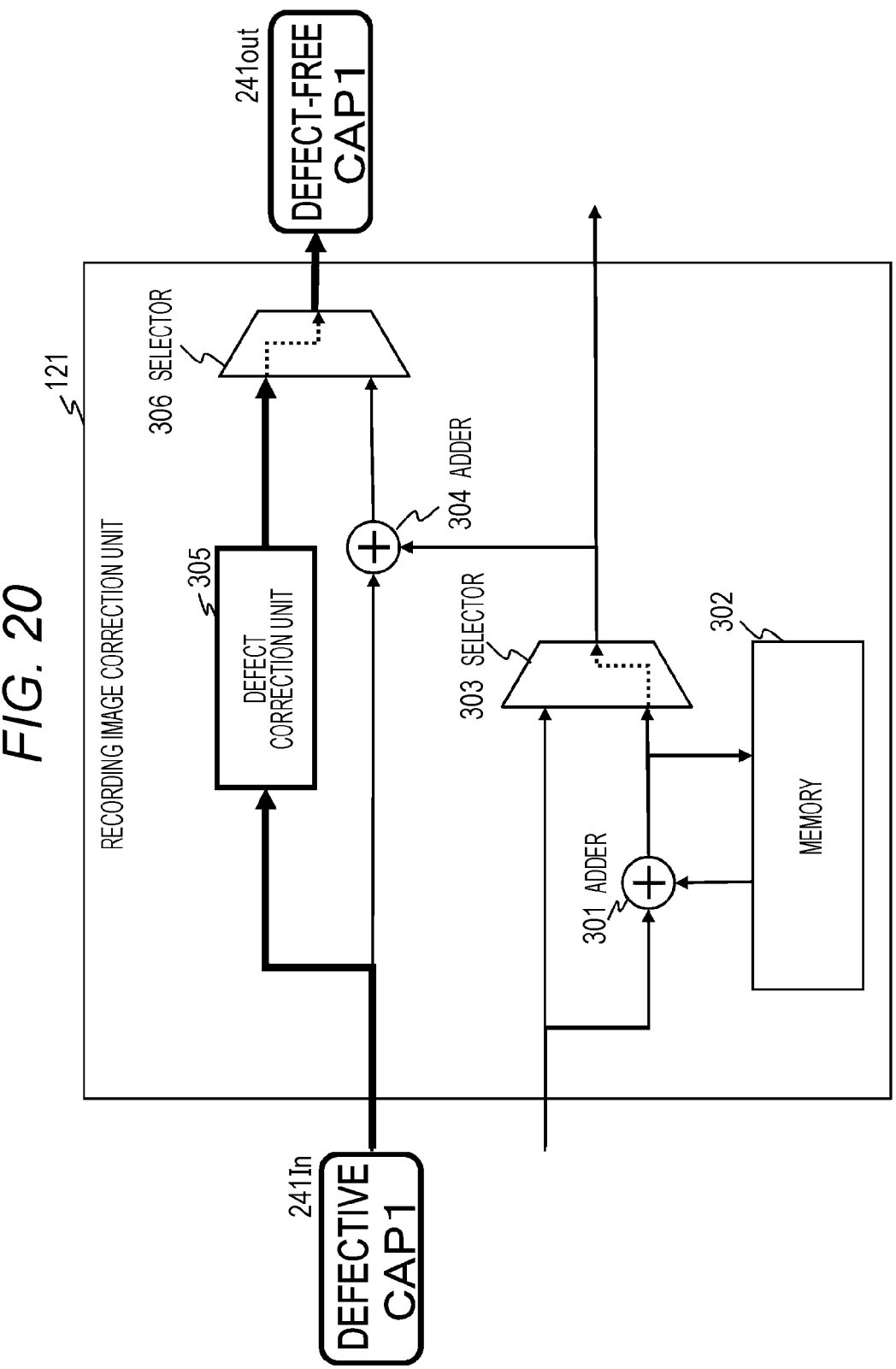
FIG. 20 is a diagram describing a configuration example in which a defective pixel in a recording image is corrected on the basis of pixel values of pixels surrounding the defective pixel.

Described below with reference to FIG. 20 is a process to which the recording image correction unit 121 according to the present embodiment has been applied, that is, a process of correcting a defective pixel in a recording image on the basis of pixel values of pixels surrounding the defective pixel.

When the exposure of the recording image (CAP image) ends, the recording image (CAP image) is stored in the frame memory 104.

However, as described above with reference to FIG. 5, the recording image (CAP image) stored in the frame memory 104 is an image including a defective pixel, that is, a pixel used for a display image (LV image), which does not have a pixel value corresponding to the exposure period of the recording image (CAP image).

In the present embodiment, a defect correction unit 305 of the recording image correction unit 121 corrects this defective pixel. That is, the recording image correction unit 121 performs a process of setting the pixel value of the defective pixel to a pixel value corresponding to the exposure period of the recording image (CAP image).

At the end of an exposure period set in accordance with a shutter speed, a defective recording image (CAP1) 241in stored in a frame memory 104 is input to the recording image correction unit 121 of the signal processing unit 105, as shown in FIG. 20.

The defective recording image (CAP1) 241in is input to the defect correction unit 305.

The defect correction unit 305 performs a process of correcting a defective pixel on the basis of the pixel values of pixels surrounding the defective pixel.

A specific example of this correction process will be described with reference to FIG. 21.

Figure 21:
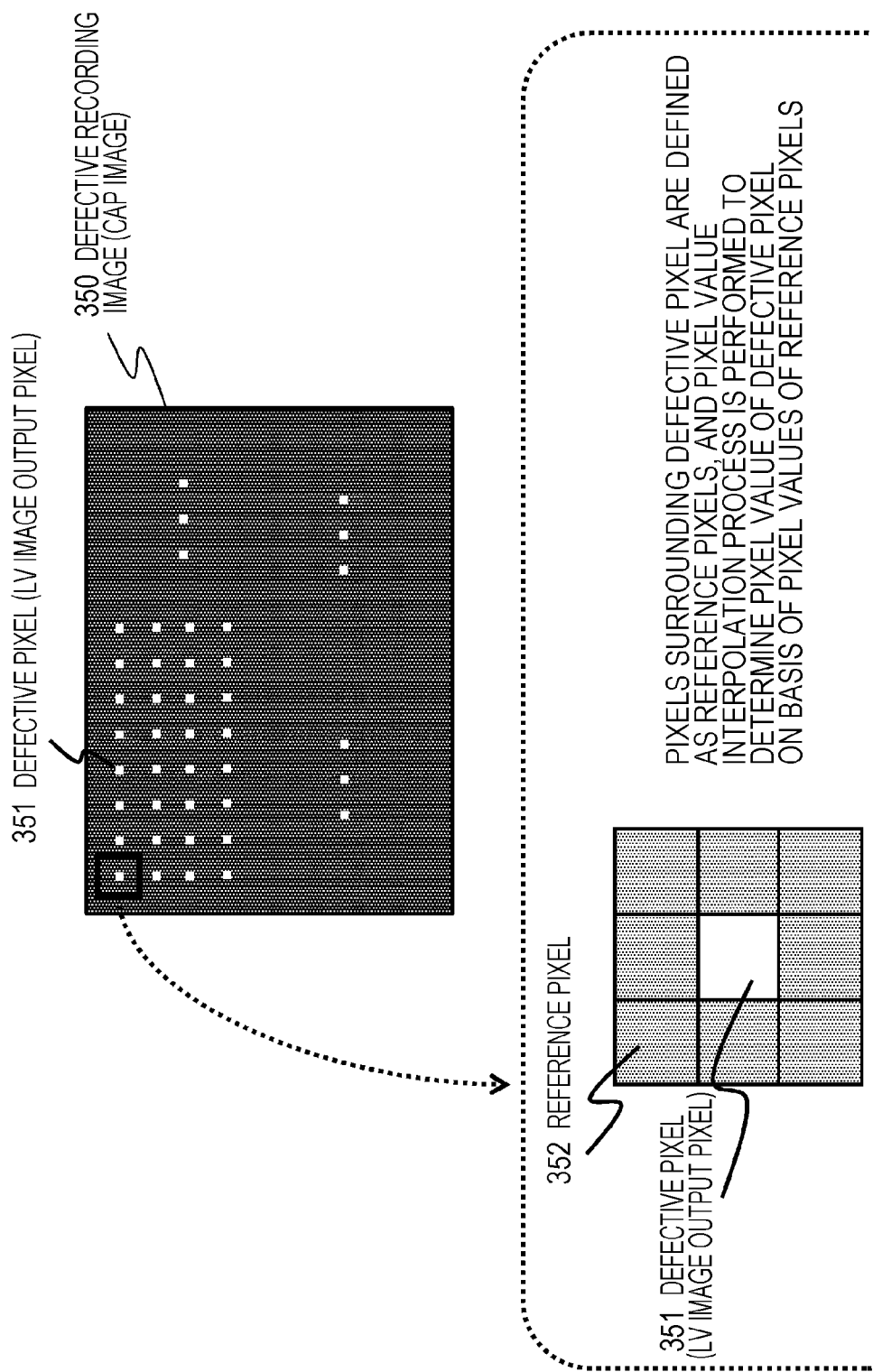
FIG. 21 is a diagram describing an example of a process of correcting a defective pixel in a recording image on the basis of pixel values of pixels surrounding the defective pixel.

FIG. 21 shows a defective recording image 350.

The defective recording image 350 includes defective pixels used to output a display image (LV image), that is, defective pixels 351 in which pixel values corresponding to the exposure period of the recording image are not set.

The defect correction unit 305 estimates and corrects the pixel values of the defective pixels on the basis of the pixel values of pixels surrounding the defective pixels 351. Specifically, as shown in the lower diagram of FIG. 21, eight pixels surrounding the defective pixel 351 are defined as reference pixels 352, and the pixel value of the defective pixel 351 is estimated on the basis of the pixel values of the reference pixels 352. Then, the estimated value is set as the pixel value of the defective pixel 351.

For example, an average value of the eight pixels surrounding the defective pixel 351 is set as the pixel value of the defective pixel 351.

Note that eight pixels surrounding a defective pixel are defined as reference pixels in the example shown in FIG. 21, but this is merely an example. It is thus possible to set the range of reference pixels in various manners.

The defect correction unit 305 shown in FIG. 20 corrects all the pixel values of defective pixels in the defective recording image (CAP1) 241in to generate a defect-free recording image (CAP1) 241out, and outputs the defect-free recording image (CAP1) 241out via a selector 306.

The defect-free recording image (CAP1) 241out is output, via the selector 306, to the image correction unit 122 in the signal processing unit 105, and is subjected to signal processing for a general camera, such as white balance (WB) adjustment and gamma correction, in the image correction unit 122. Thereafter, the defect-free recording image (CAP1) 241out is stored in a recording unit 108.

As described above, in the present embodiment, a display image (LV image) is generated and displayed on the display unit even during the exposure period of a recording image (CAP image). In addition, there is performed a process of correcting a defective pixel in the recording image (CAP image) by using normal pixels surrounding the defective pixel after the exposure period of the recording image (CAP image).

This series of processes enables a display image (LV image) to be continuously displayed on the display unit during the exposure period of a recording image (CAP image), and also enables a high-quality recording image to be generated and recorded in which the similar pixel values as those in the case of performing an exposure process for the exposure period set in accordance with the shutter speed are set in all pixels including the pixels of the recording image (CAP image).

7. Other Embodiments

Next, other embodiments will be described.

An example of the imaging apparatus that performs the process according to the present disclosure has been described above with reference to FIG. 6.

The process according to the present disclosure can also be applied to an imaging apparatus having a configuration different from the configuration of the imaging apparatus 100 shown in FIG. 6.

Figure 22:
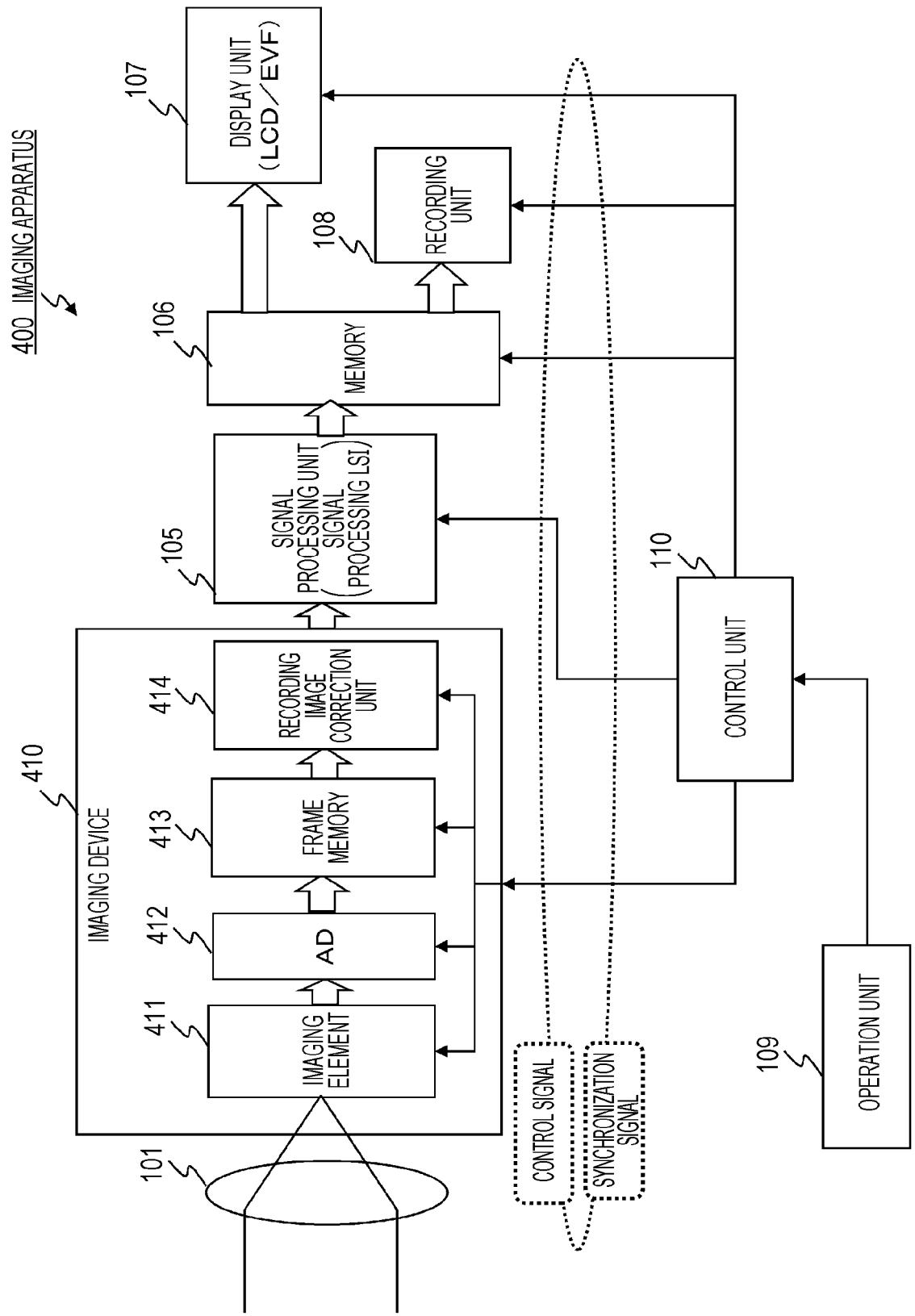
FIG. 22 is a diagram describing a configuration example of an imaging apparatus.

FIG. 22 shows a configuration example of an imaging apparatus 400 capable of performing the process according to the present disclosure, with a configuration different from the configuration shown in FIG. 6.

The imaging apparatus 400 shown in FIG. 22 includes an optical lens 101, an imaging element device 410, a signal processing unit (signal processing LSI) 105, a memory 106, a display unit (LCD/EVF) 107, a recording unit 108, an operation unit 109, and a control unit 110.

The configuration of the imaging apparatus 400 is similar to the configuration described above with reference to FIG. 6 except that the imaging apparatus 400 includes the imaging element device 410.

The imaging element device 410 of the imaging apparatus 400 shown in FIG. 22 includes an imaging element 411, an AD conversion unit 412, a frame memory 413, and a recording image correction unit 414.

Light incident through the optical lens 101 enters the imaging element 411 of the imaging element device 410, that is, the imaging element 411 including, for example, a CMOS image sensor. Then, the imaging element 411 outputs image data obtained by photoelectric conversion to the AD conversion unit 412 included in the same imaging device 410

The AD conversion unit 412 in the imaging device 410 performs A/D conversion of the input signal, that is, a process of converting an analog signal into a digital signal, and stores the converted digital value in the frame memory 413 included in the same imaging device 410.

An image frame stored in the frame memory 413 is input to the recording image correction unit 414 included in the same imaging device 410.

The recording image correction unit 414 has a configuration similar to that of the recording image correction unit 121 described above with reference to FIG. 8, and performs a process similar to that performed in the recording image correction unit 121.

That is, the imaging apparatus 400 shown in FIG. 22 performs a process of correcting a defective pixel in a recording image (CAP image) within the imaging device 410.

The signal processing unit (signal processing LSI) 105 receives an input of the image data from the recording image correction unit 414 of the imaging device 410, and performs signal processing.

The recording image correction unit 414 has only the function of the image correction unit 122 of the signal processing unit 105 described above with reference to FIG. 7.

That is, the recording image correction unit 414 performs signal processing for a general camera, such as white balance (WB) adjustment and gamma correction, to generate an output image.

The following process is similar to the process to be performed in the imaging apparatus 100 described above with reference to FIG. 6.

The imaging apparatus 400 shown in FIG. 22 is characterized in that the imaging element 411, the AD conversion unit 412, the frame memory 413, and the recording image correction unit 414 are included in the imaging device 410.

The imaging device 410 receives inputs of a control signal and a synchronization signal from the control unit 110, and performs an update process such as the starting, changing, and ending of a process on the basis of the synchronization signal.

As in the imaging apparatus 100 of FIG. 6 described above, it is possible also in the configuration of the imaging apparatus 400 shown in FIG. 22, to continuously display a display image (LV image) on the display unit during the exposure period of a recording image (CAP image), and also to generate and record a high-quality recording image in which the similar pixel values as those in the case of performing an exposure process for an exposure period set in accordance with a shutter speed are set in all pixels including the pixels of the recording image (CAP image).

8. Summary of Configurations of Present Disclosure

The embodiments of the present disclosure have been described above in detail with reference to specific examples. However, it is obvious that those skilled in the art can make modifications and substitutions of the embodiments without departing from the gist of the present disclosure. In other words, the present invention has been disclosed in the form of exemplification, and should not be restrictively interpreted. In order to judge the gist of the present disclosure, the section "CLAIMS" should be taken into consideration.

Note that the technology disclosed in the present specification can adopt the following configurations.

(1) An imaging apparatus including:

an imaging element that outputs a second image with a second pixel count that is lower than a first pixel count during an exposure period for acquiring a first image with the first pixel count; and an image correction unit that corrects pixel values of pixels corresponding to pixels included in the second image, among pixels included in the first image.

(2) The imaging apparatus according to (1), in which the image correction unit corrects pixel values of the pixels included in the first image to the similar pixel values as those in a case of performing an exposure process during the exposure period for acquiring the first image.

(3) The imaging apparatus according to (1) or (2), in which the image correction unit corrects pixel values of the pixels included in the first image on the basis of pixel values of the pixels included in the second image.

(4) The imaging apparatus according to any one of (1) to (3), further including:

a frame memory that stores an image captured by the imaging element, in which the image correction unit receives an input of the image stored in the frame memory, and corrects a pixel value.

(5) The imaging apparatus according to any one of (1) to (4), in which the first image is a recording image, and the second image is a display image.

(6) The imaging apparatus according to any one of (1) to (5), in which the image correction unit corrects a pixel value of a defective pixel among the pixels included in the first image to the similar pixel value as that in a case of performing an exposure process during the exposure period of the first image, the defective pixel being caused by an output of the second image.

(7) The imaging apparatus according to any one of (1) to (6), in which the image correction unit performs a process of adding a value of addition of pixel values of the second images to a pixel value of a pixel to be corrected in the first image, the second images being output from the imaging element during the exposure period of the first image.

(8) The imaging apparatus according to any one of (1) to (7), in which
the image correction unit includes a memory that stores a value of addition of pixel values of the second images output from the imaging element during the exposure period of the first image, and
the image correction unit performs a process of adding the value stored in the memory to a pixel value of a pixel to be corrected in the first image.

(9) The imaging apparatus according to (8), in which
the image correction unit performs a process of storing the pixel values of the second image in the memory in a case where the second image is an image captured during the exposure period of the first image.

(10) The imaging apparatus according to (8), in which
in a case where the second image is an image captured during the exposure period of the first image, the image correction unit stores the pixel values of the second image in the memory, and also performs a process of outputting the second image as a display image to a display unit.

(11) The imaging apparatus according to (8), in which
in a case where an exposure period of the second image overlaps a part of the exposure period of the first image, the image correction unit performs a process of storing, in the memory, values obtained by multiplication of the pixel values of the second image by a rate of overlap between the exposure period of the second image and the exposure period of the first image.

(12) The imaging apparatus according to any one of (1) to (11), in which
the image correction unit defines pixels surrounding a pixel to be corrected in the first image as reference pixels, and performs pixel value correction of the pixel to be corrected on the basis of pixel values of the reference pixels.

(13) The imaging apparatus according to (12), in which
the reference pixels are eight pixels surrounding the pixel to be corrected.

(14) The imaging apparatus according to any one of (1) to (13), in which
the image correction unit is included in a signal processing unit that generates the first image and the second image.

(15) The imaging apparatus according to any one of (1) to (13), in which
the image correction unit is included in an imaging device that includes, as constituent elements:
the imaging element;
an AD conversion unit that performs an AD conversion process of a signal output from the imaging element; and
a frame memory that stores a digital signal generated by the AD conversion unit.

(16) An image processing method to be performed in an imaging apparatus, the method including:
causing an imaging element to output a second image with a second pixel count that is lower than a first pixel count during an exposure period for acquiring a first image with the first pixel count; and
causing an image correction unit to correct pixel values of pixels corresponding to pixels included in the second image, among pixels included in the first image.

(17) A program for causing image processing to be performed in an imaging apparatus, the program including:
causing an imaging element to output a second image with a second pixel count that is lower than a first pixel count during an exposure period for acquiring a first image with the first pixel count; and
causing an image correction unit to correct pixel values of pixels corresponding to pixels included in the second image, among pixels included in the first image.

Furthermore, the series of processes described in the specification can be implemented by hardware, software, or a configuration in which hardware and software are combined. In a case where the processes are implemented by software, it is possible to execute a program in which a process sequence is recorded, after installing the program in a memory in a computer incorporated in dedicated hardware or installing the program on a general-purpose computer capable of performing various processes. For example, the program can be recorded in advance on a recording medium. In addition to being installed on a computer from the recording medium, the program can be received via a network such as a local area network (LAN) or the Internet and installed on a recording medium such as a built-in hard disk.

Note that the various processes described in the specification may be performed not only in time series according to the description, but also in parallel or separately depending on the processing capacity of an apparatus that performs the processes or depending on the needs. Furthermore, in the present specification, the term "system" refers to a logical set configuration of a plurality of devices, and is not limited to one in which the devices of each configuration are in the same casing.

INDUSTRIAL APPLICABILITY

As described above, according to the configuration of an embodiment of the present disclosure, an apparatus and a method are implemented which enable a display image to be output even during the exposure period of a recording image and also enable a high-quality recording image to be generated.

Specifically, for example, the imaging element outputs a display image with a low pixel count obtained as a result of thinning pixels included in the imaging element during the exposure period of a recording image with a high pixel count. A recording image correction unit receives an input of the recording image from a frame memory after an elapse of the exposure period, and corrects the pixel value of a defective pixel caused by the output of the display image from the imaging element, among pixels included in the recording image, by using the value of addition of the pixel values of display images output during the exposure period of the recording image, so that the pixel value of the defective pixel is corrected to the similar pixel value as that in the case of performing an exposure process for the exposure period of the recording image.

As a result of these processes, an apparatus and a method are implemented which enable a display image to be output even during the exposure period of a recording image and also enable a high-quality recording image to be generated.

REFERENCE SIGNS LIST

11 Optical lens
12 Imaging element
13 AD conversion unit
14 Frame memory
15 Signal processing unit
16 Memory
21 Display unit
22 Recording unit
50 Frame memory 51 LV image output pixel
60 Recording image (CAP image)
101 Optical lens
102 Imaging element
103 AD conversion unit
104 Frame memory
105 Signal processing unit
106 Memory
107 Display unit
108 Recording unit
109 Operation unit
110 Control unit
121 Recording image correction unit
122 Image correction unit
301, 304 Adder
302 Memory
303, 306 Selector
305 Defect correction unit
350 Defective recording image
351 Defective pixel (LV image output pixel)
400 Imaging apparatus
410 Imaging device
411 Imaging element
412 AD conversion unit
413 Frame memory
414 Recording image correction unit

The invention claimed is:

1. An imaging apparatus comprising:
an imaging element configured to
output a first image with a first pixel count during an exposure period, and
output one or more second images with a second pixel count that is lower than the first pixel count during the exposure period of the first image; and
an image correction circuitry configured to correct defective pixel values of defective pixels included in the first image corresponding to pixels included in the one or more second images,
wherein the defective pixel values of the defective pixels included in the first image are defective from the output of the one or more second images during the exposure period.

2. The imaging apparatus according to claim 1, wherein the image correction circuitry is further configured to correct the defective pixel values of the defective pixels included in the first image on a basis of pixel values of the pixels included in the one or more second images.

3. The imaging apparatus according to claim 1, further comprising:
a frame memory configured to store the one or more second images captured by the imaging element,
wherein the image correction circuitry is further configured to receive an input of the one or more second images stored in the frame memory.

4. The imaging apparatus according to claim 1, wherein the first image is a recording image, and the one or more second images are display images.

5. The imaging apparatus according to claim 1, wherein the image correction circuitry is further configured to correct a defective pixel value included in the first image to a similar pixel value as that in a case of performing an exposure process during the exposure period of the first image.

6. The imaging apparatus according to claim 1, wherein the image correction circuitry performs a process of adding together pixel values of the one or more second images to a defective pixel value of a pixel in the first image.

7. The imaging apparatus according to claim 1, wherein the image correction circuitry includes a memory that stores a value of pixel values of the one or more second images added together, and
the image correction circuitry is further configured to perform a process of adding the value stored in the memory to a defective pixel value of a pixel in the first image.

8. The imaging apparatus according to claim 7, wherein the image correction circuitry is further configured to store the pixel values of the one or more second images in the memory, and also performs a process of outputting the one or more second images as one or more display images to a display unit.

9. The imaging apparatus according to claim 7, wherein the imaging element is further configured to output one or more third images during an exposure period that overlaps only a part of the exposure period of the first image, and
the image correction circuitry is further configured to perform a process of storing, in the memory, values obtained by multiplication of pixel values of the one or more third images by a rate of the overlap between the exposure period of the one or more third images and the exposure period of the first image.

10. The imaging apparatus according to claim 1, wherein the image correction circuitry is further configured to
define pixels surrounding a defective pixel with a defective pixel value in the first image as reference pixels, and
perform pixel value correction of the defective pixel with the defective pixel value on a basis of pixel values of the reference pixels.

11. The imaging apparatus according to claim 10, wherein the reference pixels are eight pixels surrounding the pixel with the defective pixel value.

12. The imaging apparatus according to claim 1, wherein the image correction circuitry is included in signal processing circuitry that generates the first image and the one or more second images.

13. The imaging apparatus according to claim 1, wherein the image correction circuitry is included in an imaging device that includes, as constituent elements:
the imaging element;
an AD conversion circuitry that performs an AD conversion process of a signal output from the imaging element; and
a frame memory that stores a digital signal generated by the AD conversion circuitry.

14. An image processing method comprising:
controlling an imaging element to output a first image with a first pixel count during an exposure period;
controlling the imaging element to output one or more second images with a second pixel count that is lower than the first pixel count during the exposure period of the first image; and
controlling an image correction circuitry to correct defective pixel values of defective pixels included in the first image corresponding to pixels included in the one or more second images, wherein the defective pixel values of the defective pixels included in the first image are defective from the output of the one or more second images during the exposure period.

15. The image processing method according to claim 14, wherein controlling the image correction circuitry to correct the defective pixel values of the defective pixels corresponding to the pixels included in the one or more second images further includes the image correction circuitry correcting the defective pixel values of the defective pixels included in the first image on a basis of pixel values of the pixels included in the one or more second images.

16. The image processing method according to claim 14, further comprising:
   storing, with a frame memory, the one or more second images that are output by the imaging element,
   wherein controlling the image correction circuitry to correct the defective pixel values of the defective pixels included in the first image corresponding to the pixels included in the one or more second images further includes receiving, with the image correction circuitry, an input of the one or more second images stored in the frame memory.

17. The image processing method according to claim 14, wherein
   the first image is a recording image, and the one or more second images are display images.

18. The image processing method according to claim 14, wherein
   controlling the image correction circuitry to correct the defective pixel values of the defective pixels included in the first image corresponding to the pixels included in the one or more second images further includes performing a process of adding together pixel values of the one or more second images to a defective pixel value of a defective pixel in the first image.

19. The image processing method according to claim 14, further comprising:
   storing, with a memory, a value of pixel values of the one or more second images added together,
   wherein controlling the image correction circuitry to correct the defective pixel values of the defective pixels included in the first image corresponding to the pixels included in the one or more second images further includes performing a process of adding the value stored in the memory to a defective pixel value of a defective pixel in the first image.

20. A non-transitory computer-readable medium comprising a program that, when executed by an electronic processor, causes the electronic processor to perform a set of operations comprising:
   controlling an imaging element to output a first image with a first pixel count during an exposure period;
   controlling the imaging element to output one or more second images with a second pixel count that is lower than the first pixel count during the exposure period of the first image; and
   controlling an image correction circuitry to correct defective pixel values of defective pixels included in the first image corresponding to pixels included in the one or more second images,
   wherein the defective pixel values of the defective pixels included in the first image are defective from the output of the one or more second images during the exposure period.

\* \* \* \* \*